(12) United States Patent
Imai

(10) Patent No.: US 11,783,215 B2
(45) Date of Patent: Oct. 10, 2023

(54) INFORMATION PROCESSING APPARATUS AND RECOMMENDATION CONTROL METHOD

(71) Applicant: FUJITSU LIMITED, Kawasaki (JP)

(72) Inventor: Takashi Imai, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 355 days.

(21) Appl. No.: 16/939,707

(22) Filed: Jul. 27, 2020

(65) Prior Publication Data
US 2021/0034996 A1    Feb. 4, 2021

(30) Foreign Application Priority Data

Jul. 29, 2019  (JP) ................. 2019-139236

(51) Int. Cl.
  *G06N 20/00*  (2019.01)
  *G06N 7/01*   (2023.01)

(52) U.S. Cl.
  CPC .............. *G06N 7/01* (2023.01); *G06N 20/00* (2019.01)

(58) Field of Classification Search
  CPC .. G06F 16/9535; G06F 16/951; G06F 16/683; G06F 16/907; G06N 7/005; G06N 5/048; G06N 5/025; H04N 21/258; G06Q 30/0631
  See application file for complete search history.

(56) References Cited

U.S. PATENT DOCUMENTS

| | | | | |
|---|---|---|---|---|
| 7,908,238 B1* | 3/2011 | Nolet | ...................... | G06N 7/01 |
| | | | | 706/52 |
| 8,374,985 B1* | 2/2013 | Das | ...................... | G06F 16/951 |
| | | | | 706/46 |
| 2012/0317106 A1* | 12/2012 | Akiyama | .............. | G06F 16/907 |
| | | | | 707/730 |
| 2014/0052681 A1* | 2/2014 | Nitz | ...................... | G06N 5/048 |
| | | | | 706/46 |
| 2015/0074544 A1* | 3/2015 | Tateno | .................. | G06F 16/683 |
| | | | | 715/745 |

(Continued)

FOREIGN PATENT DOCUMENTS

| | | |
|---|---|---|
| JP | 2005-71026 A | 3/2005 |
| JP | 2009-129298 A | 6/2009 |

(Continued)

*Primary Examiner* — Saba Dagnew
(74) *Attorney, Agent, or Firm* — STAAS & HALSEY LLP

(57) ABSTRACT

An information processing apparatus includes: a processor configured to: when a request for recommendation information and situation information are input, identify one or more actions associated with a situation indicated by the situation information based on action history information in which a past action is associated with a situation where the past action is executed, the situation information indicating a situation of a user; for each target action among the one or more identified actions, calculate a first probability and a second probability, the first probability being a probability that each target action is included as a choice for the user, the second probability being a probability that the user selects each target action when the each target action is included as the choice; and output an action with a relatively low first probability and a relatively high second probability, as the recommendation information, among the one or more actions.

8 Claims, 21 Drawing Sheets

| USER ID | SITUATION | RECOMMENDATION | ACTION | |
|---|---|---|---|---|
| U0001 | C0002 (CASTLE AAA, AFTERNOON, CLEAR) | X0005 (PARK WW) | X0002 (SOUVENIR SHOP YY) | |
| U0002 | C0002 (CASTLE AAA, AFTERNOON, CLEAR) | X0005 (PARK WW) | X0005 (PARK WW) | |
| U0003 | C0002 (CASTLE AAA, AFTERNOON, CLEAR) | X0005 (PARK WW) | X0005 (PARK WW) | T1 |
| U0004 | C0002 (CASTLE AAA, AFTERNOON, CLEAR) | X0005 (PARK WW) | X0005 (PARK WW) | |
| U0005 | C0002 (CASTLE AAA, AFTERNOON, CLEAR) | X0005 (PARK WW) | X0002 (SOUVENIR SHOP YY) | |
| U0006 | C0002 (CASTLE AAA, AFTERNOON, CLEAR) | X0002 (SOUVENIR SHOP YY) | X0002 (SOUVENIR SHOP YY) | |
| U0007 | C0002 (CASTLE AAA, AFTERNOON, CLEAR) | X0002 (SOUVENIR SHOP YY) | X0003 (RESTAURANT ZZZ) | |
| U0008 | C0002 (CASTLE AAA, AFTERNOON, CLEAR) | X0002 (SOUVENIR SHOP YY) | X0002 (SOUVENIR SHOP YY) | |
| U0009 | C0002 (CASTLE AAA, AFTERNOON, CLEAR) | X0002 (SOUVENIR SHOP YY) | X0002 (SOUVENIR SHOP YY) | |
| U0010 | C0002 (CASTLE AAA, AFTERNOON, CLEAR) | X0002 (SOUVENIR SHOP YY) | X0002 (SOUVENIR SHOP YY) | |
| U0011 | C0002 (CASTLE AAA, AFTERNOON, CLEAR) | | X0003 (RESTAURANT ZZZ) | |
| U0012 | C0002 (CASTLE AAA, AFTERNOON, CLEAR) | | X0005 (PARK WW) | |
| U0013 | C0002 (CASTLE AAA, AFTERNOON, CLEAR) | | X0002 (SOUVENIR SHOP YY) | |
| U0014 | C0002 (CASTLE AAA, AFTERNOON, CLEAR) | | X0000 (NEAR STATION AAA) | T2 |
| U0015 | C0002 (CASTLE AAA, AFTERNOON, CLEAR) | | X0005 (PARK WW) | |

| SITUATION | ACTION | EXECUTION PROBABILITY $P_c(x)$ | SELECTION PROBABILITY $P_c(x\|k_x)$ | KNOWN PROBABILITY $P_c(k_x)$ |
|---|---|---|---|---|
| C0002 (CASTLE AAA, AFTERNOON, CLEAR) | X0005 (PARK WW) | 0.4 | 0.6 | 0.67 |
| C0002 (CASTLE AAA, AFTERNOON, CLEAR) | X0002 (SOUVENIR SHOP YY) | 0.2 | 0.8 | 0.25 |

(56) References Cited

U.S. PATENT DOCUMENTS

| | | | |
|---|---|---|---|
| 2016/0086094 A1* | 3/2016 | Tsubouchi | G06N 5/025 |
| | | | 706/52 |
| 2016/0260153 A1* | 9/2016 | Gerard | G06Q 30/0631 |
| 2018/0189860 A1* | 7/2018 | Hamada | G06F 16/9535 |
| 2018/0240030 A1* | 8/2018 | Shen | G06F 16/00 |

FOREIGN PATENT DOCUMENTS

| | | |
|---|---|---|
| JP | 2012-164227 A | 8/2012 |
| JP | 2016-161998 A | 9/2016 |
| WO | WO 2013/088682 A1 | 6/2013 |

* cited by examiner

FIG. 5

| | | SD |
|---|---|---|
| DEVICE ID | IDx | |
| POSITION | LONGITUDE ○○ LATITUDE ×× | |
| ACTION TAG | IS WALKING | |
| HEART RATE | 80 | |

| | | CT |
|---|---|---|
| POSITION | SPOT A | |
| WEATHER | CLEAR | |
| TIME | 12:00 - 13:00 | |

FIG. 6

| USER ID | SITUATION | RECOMMENDATION | ACTION |
|---|---|---|---|
| U0001 | C0001 (NEAR STATION AAA, LUNCH TIME, CLEAR) | X0001 (RESTAURANT XXX) X0002 (SOUVENIR SHOP YY) | X0003 (RESTAURANT ZZZ) X0004 (CASTLE AAA) |
| U0001 | C0002 (CASTLE AAA, AFTERNOON, CLEAR) | X0005 (PARK WW) | X0002 (SOUVENIR SHOP YY) |
| U0001 | C0002 (CASTLE AAA, AFTERNOON, CLEAR) | | X0005 (PARK WW) |
| U0001 | C0003 (NAER STATION AAA, EVENING, CLEAR) | X0001 (RESTAURANT XXX) X0002 (SOUVENIR SHOP YY) | X0002 (SOUVENIR SHOP YY) |
| U0001 | C0004 (PARK WW, EVENING, CLEAR) | | X0000 (NEAR STATION AAA) |
| ... | ... | ... | ... |

FIG. 7

| USER ID | SITUATION | RECOMMENDATION | ACTION |
|---|---|---|---|
| U0001 | C0002 (CASTLE AAA, AFTERNOON, CLEAR) | X0005 (PARK WW) | X0002 (SOUVENIR SHOP YY) |
| U0002 | C0002 (CASTLE AAA, AFTERNOON, CLEAR) | X0005 (PARK WW) | X0005 (PARK WW) |
| U0003 | C0002 (CASTLE AAA, AFTERNOON, CLEAR) | X0005 (PARK WW) | X0005 (PARK WW) |
| U0004 | C0002 (CASTLE AAA, AFTERNOON, CLEAR) | X0005 (PARK WW) | X0005 (PARK WW) |
| U0005 | C0002 (CASTLE AAA, AFTERNOON, CLEAR) | X0005 (PARK WW) | X0002 (SOUVENIR SHOP YY) |
| U0006 | C0002 (CASTLE AAA, AFTERNOON, CLEAR) | X0002 (SOUVENIR SHOP YY) | X0002 (SOUVENIR SHOP YY) |
| U0007 | C0002 (CASTLE AAA, AFTERNOON, CLEAR) | X0002 (SOUVENIR SHOP YY) | X0003 (RESTAURANT ZZZ) |
| U0008 | C0002 (CASTLE AAA, AFTERNOON, CLEAR) | X0002 (SOUVENIR SHOP YY) | X0002 (SOUVENIR SHOP YY) |
| U0009 | C0002 (CASTLE AAA, AFTERNOON, CLEAR) | X0002 (SOUVENIR SHOP YY) | X0002 (SOUVENIR SHOP YY) |
| U0010 | C0002 (CASTLE AAA, AFTERNOON, CLEAR) | X0002 (SOUVENIR SHOP YY) | X0002 (SOUVENIR SHOP YY) |
| U0011 | C0002 (CASTLE AAA, AFTERNOON, CLEAR) | | X0003 (RESTAURANT ZZZ) |
| U0012 | C0002 (CASTLE AAA, AFTERNOON, CLEAR) | | X0005 (PARK WW) |
| U0013 | C0002 (CASTLE AAA, AFTERNOON, CLEAR) | | X0002 (SOUVENIR SHOP YY) |
| U0014 | C0002 (CASTLE AAA, AFTERNOON, CLEAR) | | X0000 (NEAR STATION AAA) |
| U0015 | C0002 (CASTLE AAA, AFTERNOON, CLEAR) | | X0005 (PARK WW) |

T1

| SITUATION | ACTION | EXECUTION PROBABILITY $P_c(x)$ | SELECTION PROBABILITY $P_c(x|kx)$ | KNOWN PROBABILITY $P_c(kx)$ |
|---|---|---|---|---|
| C0002 (CASTLE AAA, AFTERNOON, CLEAR) | X0005 (PARK WW) | 0.4 | 0.6 | 0.67 |
| C0002 (CASTLE AAA, AFTERNOON, CLEAR) | X0002 (SOUVENIR SHOP YY) | 0.2 | 0.8 | 0.25 |
| | | | | |

| USER | SPORTS | ART | GOURMET | HISTORY | ARCHITECTURE | NATURE | ... |
|---|---|---|---|---|---|---|---|
| U0001 | 0.8 | 0.1 | 0.9 | 0.2 | 0.2 | 0.7 | |
| U0002 | 0.3 | 0.2 | 0.6 | 0.8 | 0.9 | 0.5 | |
| U0003 | 0.6 | 0.8 | 0.2 | 0.1 | 0.7 | 0.3 | |
| ... | | | | | | | |

INFORMATION PROCESSING APPARATUS AND RECOMMENDATION CONTROL METHOD

CROSS-REFERENCE TO RELATED APPLICATION

This application is based upon and claims the benefit of priority of the prior Japanese Patent Application No. 2019-139236, filed on Jul. 29, 2019, the entire contents of which are incorporated herein by reference.

FIELD

The embodiments discussed herein are related to an information processing apparatus and a recommendation control method.

BACKGROUND

A system has been developed which identifies a situation of a user by using sensing data and others observed in a user terminal, and recommends an action that may be taken by the user in the future based on the situation or the like. For example, an apparatus is known which classifies individual users into a group of each context and recommends a target user to take the contents used by another user who belongs to the group of the context indicated by information extracted based on the situation information of the target user. Also, a recommendation condition correcting apparatus has been proposed which stores a recommendation history including each attribute value of a context of a user and success/failure information indicating whether a target user has taken a predetermined action, and stores an attribute value of a context of a successful user. This apparatus calculates a ratio of a recommendation history indicating that the user has taken the predetermined action and a ratio of a success history in which an attribute value of a context matches a recommendation condition, and corrects the recommendation condition based on the obtained ratios. A system has also been proposed which generates action support information according to a context of a user based on information indicating a relationship between an action predicted to be taken by a user and the user in a quantitative manner, and provides the information at a timing when a variation rate of the relationship exceeds a threshold value.

Related technologies are disclosed in, for example, International Publication Pamphlet No. 2013/088682 and Japanese Laid-open Patent Publication No. 2005-071026.

SUMMARY

According to an aspect of the embodiments, an information processing apparatus includes: a memory; and a processor coupled to the memory and the processor configured to: when a request for recommendation information and situation information are input, identify one or more actions associated with a situation indicated by the situation information based on action history information in which a past action is associated with a situation where the past action is executed, the situation information indicating a situation of a user who uses the recommendation information, the action history information being stored in the memory; for each target action among the one or more identified actions, calculate a first probability and a second probability, the first probability being a probability that each target action is included as a choice for the user, the second probability being a probability that the user selects each target action when the each target action is included as the choice; and output an action with a relatively low first probability and a relatively high second probability, as the recommendation information, among the one or more actions.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a view illustrating an example of sensor data and context information;

FIG. 6 is a view illustrating an example of action history information;

FIG. 7 is a view illustrating an example of a prediction of a selection probability and a known probability;

FIG. 10 is a view illustrating an example of user attribute information;

DESCRIPTION OF EMBODIMENTS

Even though an item to be recommended to a user is selected using an action history of another user, information highly valuable for the user may not be recommended. For example, even in a case where all users who stop by a place X go to a place Y, the place X may be on the way to the place Y, and people other than the people who go to the place Y may not go to the place X. In this case, since the user present at the place X is planning to go to the place Y, the place Y would not be valuable information for the user present at the place X even when the place Y is recommended to the user. Meanwhile, there is a possibility that a place which is not selected by a large number of users would not be selected because the place is not attractive. Thus, a place which is less likely to be selected may not be valuable information for users even when the place is recommended.

Figure 1:
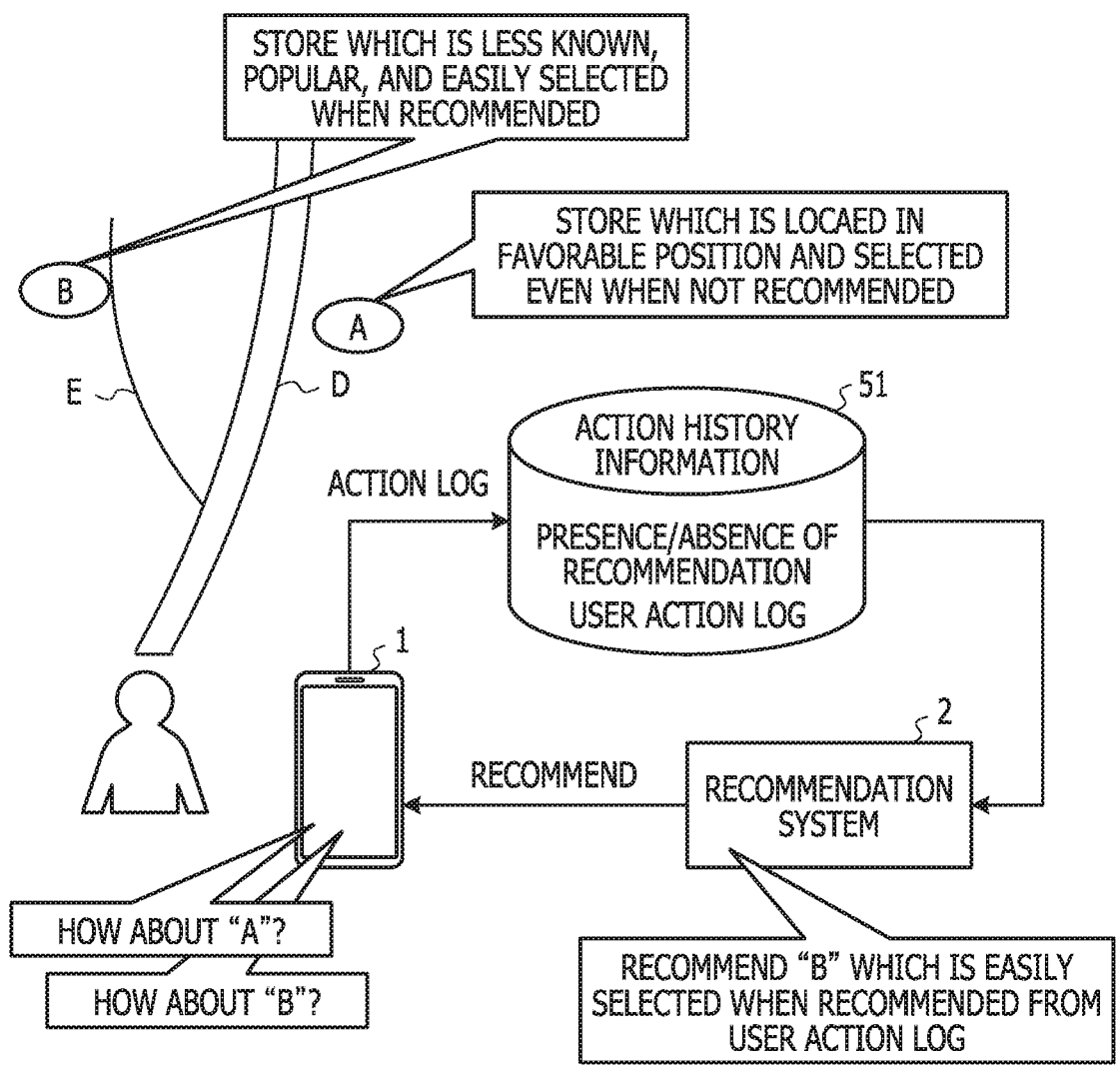
FIG. 1 is a view illustrating an example of a recommendation control method according to an embodiment.

FIG. 1 is a view illustrating an example of a recommendation control method according to an embodiment. In the example of FIG. 1, it is assumed that a store A is located on a main street D, and a store B is located on a back street E. Further, it is assumed that the store A located on the main street D may be selected due to its favorable position even though a recommendation system 2 does not recommend the store A. Meanwhile, it is assumed that the store B is less known because of being located on the back street E where a small number of people pass by, but has a good reputation and is popular to people who know the store B. In this case, the store B may be easily selected by a user when the recommendation system 2 outputs information for recommending the store B to the user. That is, in the case of FIG. 1, the store B rather than the store A would be valuable information for the user when the store B is recommended.

When a request for recommendation information or the like is received, the recommendation system 2 outputs information to be recommended to a user, to a recommendation information requesting source. Here, it is assumed that the recommendation system 2 stores action history information 51 in which an action executed in the past and a situation where the action was executed are associated with each other. The action history information 51 also includes information indicating a presence or absence of recommendation together with an action of a user. When information which is a log of an action of a user such as location information or the like is received from a terminal which is a transmission destination of recommendation information, the recommendation system 2 updates the action history information 51 using information obtained from the terminal. As a result, the action history information 51 may record information indicating, for example, that when the store B is recommended to ten users with user IDs of 001 to 010 between 12:00 and 13:00, nine users stop by the store B. Further, the action history information 51 also records information indicating, for example, that when the store A is recommended to five users with user IDs of 011 to 015 between 12:00 and 13:00, one user stops by the store A. In addition, any of the stores A and B may be recommended until information is accumulated in the action history information 51.

It is assumed that a request for recommendation information is transmitted from a terminal 1 of a user to the recommendation system 2 at a later time. Hereinafter, descriptions will be made on an example of a process performed by the recommendation system 2 for determining an action to be recommended to the user of the terminal 1. The recommendation system 2 acquires the request for recommendation information, and identifies situation information indicating a situation of the user who uses the recommendation information. Examples of the situation information may include information on a timing when the request for recommendation information is received or sensing data measured by a sensor mounted in the terminal 1. In addition, when sensing data is used as the situation information, it is assumed that the sensing data is also transmitted to the recommendation system 2 together with the request for recommendation information.

The recommendation system 2 identifies one or more actions associated with the situation indicated by the situation information in the action history information 51. For example, it is assumed that the request for recommendation information is received from the terminal 1 at 12:30, and the recommendation system 2 identifies two actions that include stopping by the store A and stopping by the store B.

For each identified action, the recommendation system 2 calculates a first probability indicating a probability that the action is included in choices for the user of the terminal 1. Here, the first probability may refer to a probability that the user may recognize each identified action as a choice. Further, the first probability may refer to a probability that the action is known to the user. For example, it is assumed that the first probability of the action of stopping by the store B is smaller than the first probability of the action of stopping by the store A, for example, because the store B is less known whereas the store A is located on the main street D and can be seen from the position of the user of the terminal 1.

Further, for each identified action, the recommendation system 2 calculates a second probability indicating a probability that the user of the terminal 1 will execute the action when the action is included in choices for the user of the terminal 1. The second probability may be approximated to a rate at which recommended information is executed. For example, when one of five users who are recommended to stop by the store A stops by the store A, the second probability of the action of stopping by the store A is 20%. Meanwhile, when nine of ten users who are recommended to stop by the store B stop by the store B, the second probability of the action of stopping by the store B is 90%.

The recommendation system 2 determines to recommend an action having the relatively low first probability and the relatively high second probability among the actions for which the first and second probabilities are calculated, to the user of the terminal 1. Here, the action with the relatively low first probability and the relatively high second probability is an action that is less likely to be known to the user but is highly likely to be selected by the user who knows the action. Accordingly, the action with the relatively low first probability and the relatively high second probability may refer to an action that the user of the terminal 1 does not know but desires to select when the action is recommended. In the example of FIG. 1, the action of stopping by the store B has the relatively low first probability and the relatively high second probability, as compared to the action of stopping by the store A. In other words, it is highly likely that the user of the terminal 1 does not know the store B, but will stop by the store B when the store B is recommended to the user of the terminal 1. Accordingly, the recommendation system 2 may recommend the user of the terminal 1 to stop by the store B, so as to recommend information highly valuable for the user of the terminal 1.

In addition, FIG. 1 is an example, and the recommendation control method may be changed by an implementation. For example, the recommendation system 2 may be an apparatus directly accessed by a user, rather than an apparatus that communicates with the terminal 1. For example, an information processing apparatus in which the recommendation system 2 operates may be provided in an information center, and when a user performs an input to the information processing apparatus, recommendation information may be displayed on a display or the like.

<Example of Configuration and Network>

Figure 2:
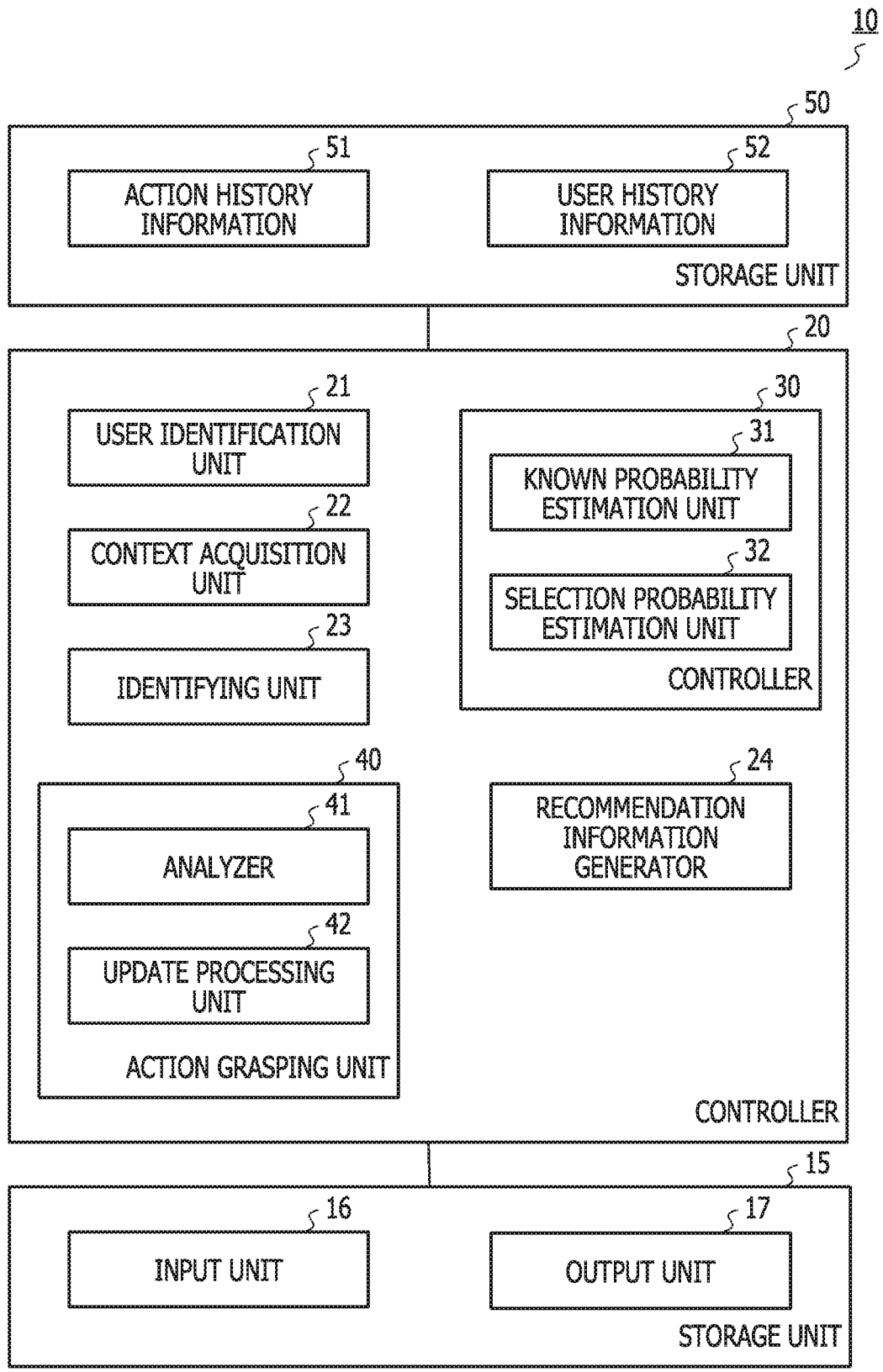
FIG. 2 is a diagram illustrating an example of a configuration of an information processing apparatus.

FIG. 2 is a diagram illustrating an example of the configuration of an information processing apparatus 10. The information processing apparatus 10 includes an input/output processing unit 15, a controller 20, and a storage unit 50. The input/output processing unit 15 includes an input unit 16 and an output unit 17. The input unit 16 is used for inputting a request for recommendation information or information such as sensing data or the like. In addition, the input unit 16 may receive a request message or the like transmitted from the terminal 1. The output unit 17 is used for outputting obtained recommendation information. When the input unit 16 receives the request message transmitted from the terminal 1, the output unit 17 transmits recommendation information toward the terminal 1.

The storage unit 50 stores the action history information 51, and may store user attribute information 52 as an option. The action history information 51 is information in which an action executed in the past and a situation where the action was executed are associated with each other. The user attribute information 52 includes information usable for identifying hobbies, preference, or the like of each user. Examples of the action history information 51 and the user attribute information 52 will be described later.

The controller 20 includes a user identification unit 21, a context acquisition unit 22, an identifying unit 23, a recommendation information generator 24, a calculator 30, and an action grasping unit 40. The calculator 30 includes a known probability estimation unit 31 and a selection probability estimation unit 32. In addition, the action grasping unit 40 includes an analyzer 41 and an update processing unit 42.

The user identification unit 21 identifies information on a user who is provided with recommendation information, using information input from the input unit 16. The context acquisition unit 22 identifies situation information indicating a situation of the user who is provided with recommendation information. The context acquisition unit 22 acquires, for example, information obtained from sensing data input from the input unit 16 or information such as a timing when recommendation information is requested, as the situation information. In the descriptions herein below, the situation information indicating a situation of the user who uses recommendation information may be referred to as a "context." The identifying unit 23 identifies actions associated with the situation information obtained by the context acquisition unit 22, from the action history information 51.

The known probability estimation unit 31 estimates a probability that each of the actions identified in the identifying unit 23 is known to the user. In the descriptions herein below, the probability that a specific action is known to a user who does not receive a recommendation from the information processing apparatus 10 may be referred to as a "known probability." In addition, in a case where the user knows the action but does not recognize the action as a choice, it is regarded that the user does not know the candidate. In other words, it may be said that a known probability of a specific action is a probability that a user who does not receive recommendation information recognizes the action as a choice in the current situation. The selection probability estimation unit 32 estimates a probability that the user will select each of the actions identified in the identifying unit 23 when the user knows the action. In the descriptions herein below, the probability that the user will select the specific action when the user knows the action may be referred to as a "selection probability." The selection probability may be a probability that the user will select the action included as a choice in the current situation.

The recommendation information generator 24 selects an action with the relatively low known probability and the relatively high selection probability, as an object to be recommended, using calculation results from the known probability estimation unit 31 and the selection probability estimation unit 32. In addition, the object to be recommended as an "action" ("recommendation target") may be not only an action of a user who is provided with recommendation information but also information such as a store of a destination, an event, or the like. The recommendation information generator 24 generates information for recommending a selected object. For example, the recommendation information generator 24 may generate a notification message for notifying the recommendation target to the terminal 1 of the user.

The analyzer 41 analyzes information received from the terminal 1 or information input from the input unit 16, so as to analyze an action taken by the user who has received recommendation information. The update processing unit 42 updates the action history information 51 using the analysis result obtained from the analyzer 41.

Figure 3:
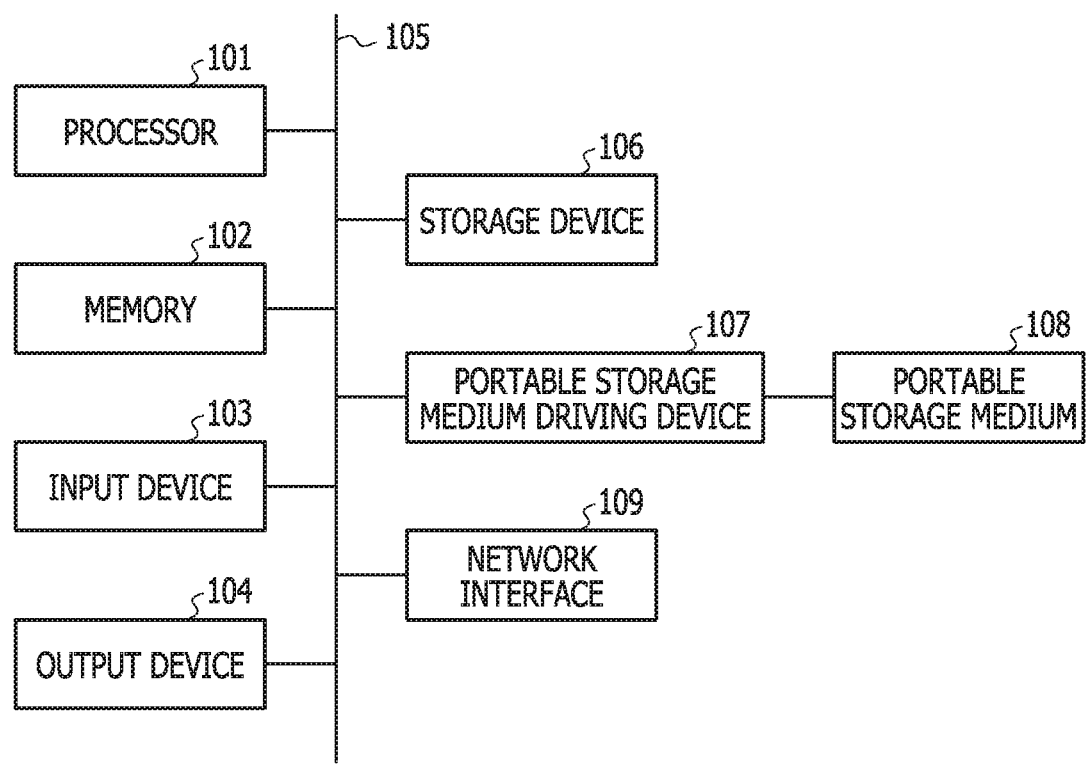
FIG. 3 is a diagram illustrating an example of a hardware configuration of the information processing apparatus.

FIG. 3 is a view illustrating an example of a hardware configuration of the information processing apparatus 10. The information processing apparatus 10 includes a processor 101, a memory 102, a bus 105, and a network interface 109. In addition, the information processing apparatus 10 may include one or more of an input device 103, an output device 104, a storage device 106, and a portable storage medium driving device 107. The information processing apparatus 10 may be implemented by, for example, a computer, a server device, or the like.

The processor 101 is an arbitrary processing circuit, and may be, for example, a central proceeding unit (CPU). The processor 101 is able to execute programs stored in, for example, the memory 102 or the storage device 106. The memory 102 appropriately stores data obtained by the operation of the processor 101 or data used for a processing by the processor 101. The storage device 106 stores programs, data, or the like, and appropriately provides stored information to the processor 101 and others. The network interface 109 performs a process for allowing the information processing apparatus 10 to communicate with other apparatuses such as the terminal 1 and others.

The bus 105 connects the processor 101, the memory 102, the input device 103, the output device 104, the storage device 106, the portable storage medium driving device 107, and the network interface 109 to each other, such that data may be transmitted/received among the devices. The input device 103 is an arbitrary device used for inputting information such as a keyboard, a mouse, a microphone, a camera or the like, and the output device 104 is an arbitrary device used for outputting data such as a display or the like. The portable storage medium driving device 107 is able to output the data in the memory 102 or the storage device 106 to the portable storage medium 108, and is further able to read programs, data, or the like from the portable storage medium 108. Here, the portable storage medium 108 may be an arbitrary portable storage medium including a compact disc recordable (CD-R) or a digital versatile disk recordable (DVD-R).

In the information processing apparatus 10, the processor 101 operates as the controller 20. The memory 102 and the storage device 106 operate as the storage unit 50. When a request for recommendation information is received from the terminal 1 and the recommendation information is transmitted to the terminal 1, the input/output processing unit 20 is implemented by the network interface 109. When data input to the information processing apparatus 10 is input from the input device 103, the input/output processing unit 20 may be implemented by the input device 103 and the output device 104. In this case, the input/output processing unit 20 may output data such as processing results or the like to the output device 104.

Figure 4:
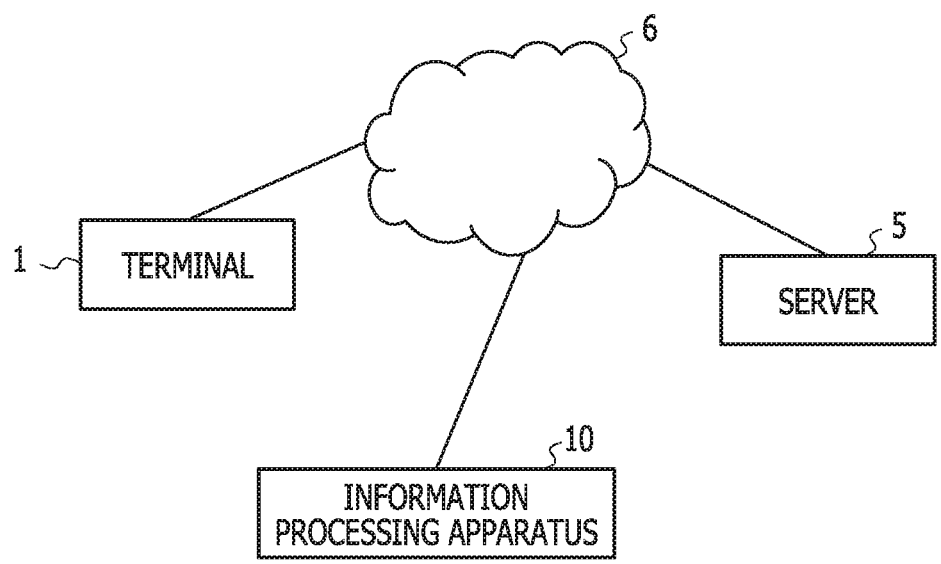
FIG. 4 is a view illustrating an example of a network.

FIG. 4 is a view illustrating an example of the network. In the example illustrated in FIG. 4, the terminal 1, a server 5, and the information processing apparatus 10 may communicate with each other via a network 6. When the information processing apparatus 10 may communicate with the server 5 as illustrated in FIG. 4, the context acquisition unit 22 may use information acquired from the server 5 as a context. For example, it is assumed that the server 5 stores weather information. Further, it is assumed that location information of the terminal 1 is transmitted from the terminal 1 to the information processing apparatus 10. In this case, the context acquisition unit 22 may access the server 5 by using the location information of the terminal 1, so as to acquire weather information at the position of the terminal 1, and may use the acquired weather information as a context of the user. In addition, the information obtained from the server 5 may be information other than weather information, and may be arbitrarily changed according to an implementation.

First Embodiment

Hereinafter, a first embodiment will be described using an example where the information processing apparatus 10 communicates with the terminal 1 and the server 5 as illustrated in FIG. 4 so as to notify recommendation information. In the example described below, it is assumed that location information or information such as sensor data or the like is notified from the terminal 1 to the information processing apparatus 10. Further, in the first embodiment, the information processing apparatus 10 may not store the user attribute information 52.

(1) Example of Data

FIG. 5 is a view illustrating an example of sensor data and context information. In addition, the sensor data or the context information illustrated in FIG. 5 is merely an example. The information elements included in the sensor data or the context information may be arbitrarily changed according to an implementation.

In FIG. 5, sensor data SD includes a device ID, a position, an action tag, and a heart rate. The device ID is identification information that may uniquely identify the terminal 1. In the example of FIG. 5, the device ID is IDx. The position represents a position of the terminal 1. In the example of FIG. 5, the latitude and the longitude of the position of the terminal 1 are notified as sensor data to the information processing apparatus 10. The action tag is a type of an action predicted to have been taken by the user of the terminal 1 as a result of analyzing the sensor data or the like provided in the terminal 1. In the example of FIG. 5, the user who has the terminal 1 is walking. Further, the heart rate of the user of the terminal 1 is 80/min. In the sensor data SD, the heart rate is information obtained from a sensor that is able to communicate with the terminal 1 and is attached to the user's body. As represented in the sensor data SD, the sensor data may include not only data from a sensor mounted in the terminal 1 but also data measured by a sensor mounted in a device capable of communicating with the terminal 1.

In FIG. 5, CT is an example of context information. The context acquisition unit 22 of the information processing apparatus 10 is able to generate the context information by analyzing at least a portion of the obtained sensor data. At this time, since the context acquisition unit 22 is able to select data to be used according to an implementation, the context acquisition unit 22 may not use all of the sensor data. For example, the context acquisition unit 22 may generate the context information represented in the CT from the sensor data represented in the SD of FIG. 5. The context acquisition unit 22 may store information in advance for converting a combination of the latitude and the longitude into a building or facility located at the position indicated by the combination. In addition, the context acquisition unit 22 may divide a region where the terminal 1 may exist into a plurality of spots, and store information in which a combination of the latitude and the longitude included in each spot is associated with the spot. In the example of FIG. 5, since the east longitude ○○ and the north latitude xx are included in a spot A, the position is spot A in the context information CT. In the example of FIG. 5, the time information in the context information is divided on an hourly basis. In this example, it is assumed that a timing when the sensor data SD is acquired is included in the time between 12:00 and 13:00. Further, in the example of FIG. 5, the context acquisition unit 22 acquires the weather of the spot A at the timing when the sensor data SD is received, from the server 5, and includes the weather information in the context information CT.

FIG. 6 is a view illustrating an example of the action history information 51. The action history information 51 includes a user ID, a situation, a recommendation, and an action. The user ID is information for identifying a user associated with a terminal which is an output destination of recommendation information. In FIG. 6, each context is represented by identification information (context ID). In the context ID=C0001, the terminal 1 is located near the station AAA, it is a lunch time, and the weather is clear. In the context having context ID of C0002, the terminal 1 is located in the castle AAA, it is afternoon, and the weather is clear. In the context having context ID of C0003, the terminal 1 is located near the station AAA, it is evening, and the weather is clear. In the context having context ID of C0004, the terminal 1 is located in the park WW, it is evening, and the weather is clear.

The recommendation column records a destination recommended to a user identified by a user ID in a context included in an entry. Meanwhile, the action column records information of a place which the user identified by the user ID actually stops by after acquiring the information of the recommended destination, in the context included in the entry. For example, in a first entry, the restaurant XXX (X0001) and the souvenir shop YY (X0002) are suggested as destinations for a user present near the station AAA for a lunch time on a clear day, and the user stops by the restaurant ZZZ (X0003) and the castle AAA (X0004). In a second entry, the park WW (X0005) is suggested as a destination for a user present in the castle AAA in the afternoon on a clear day, but the user stops by the souvenir shop YY (X0002). In a fourth entry, the restaurant XXX (X0001) and the souvenir shop YY (X0002) are suggested as destinations for a user present near the station AAA in the evening on a clear day, and the user stops by the souvenir shop YY (X0002).

In addition, the action history information 51 may also include information of a case where no recommendation is performed or a user does not recognize recommended information. For example, when a recommendation target is not selected in the recommendation information generator 24, no recommendation is performed for the user. In addition, even though recommendation information is generated, a recommendation result may not be transmitted to the terminal 1 due to, for example, a failure in communication between the information processing apparatus 10 and the terminal 1 of the user. In this case, the recommendation column of the action history information 51 does not record the recommended information. Even in a case where no recommendation is performed to the terminal 1 of the user, the action column records information of a place at which the user identified by the user ID stops in the context included in the entry. Accordingly, in this case, the information in the action column is a destination selected by the user from information known to the user without using recommendation information. For example, in a third entry, a user present in the castle AAA in the afternoon on a clear day stops by the park WW (X0005), as a result of executing an action without referring to recommendation information. Further, in a fifth entry, a user present in the park WW in the evening on a clear day goes near the station AAA (X0000), as a result of executing an action without referring to recommendation information.

(2) Method of Determining Highly Recommendable Information

Hereinafter, an example of a method of determining highly recommendable information by the information processing apparatus 10 will be described. The highly recommendable information is information on an action which is less likely to be known among users who acquire no recommendation information but is highly likely to be selected when the action is recommended. A symbol $P_c(x)$ refers to a probability that a user who acquires no recommendation information will execute an action "x" in a context "c" (execution probability). The execution probability $P_c(x)$ is a product of a probability that the action "x" is known to the user who acquires no recommendation information (known probability) in the context "c" and a probability that the user will select the action "x" in the context "c" when the user knows the action "x" (selection probability). The probability that the action "x" is known to the user who acquires no recommendation information in the context "c" will be described as $P_c(kx)$. Further, the probability that the user will select the action "x" in the context "c" when the user knows the action "x" will be described as $P_c(x|kx)$. Then, the following relationship is established among the execution probability, the known probability, and the selection probability.

Execution probability=known probability×selection probability $$P_c(x) = P_c(kx) \times P_c(x|kx) \quad (1)$$

That is, an action "x" having the relatively low execution probability may be an action "x" which is hardly executed because the action "x" itself is less known, or an action "x" which is known but is not selected because the action "x" is less attractive.

Thus, in the information processing apparatus 10, the selection probability estimation unit 32 estimates the selection probability, and the known probability estimation unit 31 estimates the known probability. The selection probability estimation unit 32 limits a population used for calculations when the estimating process is performed, to users to whom the information processing apparatus 10 provides recommendation information. The users who are provided with recommendation information on the action "x" recognize the action "x." Thus, the selection probability estimation unit 32 approximates $P_c(x|kx)$ to a rate at which the action "x" is selected in the context "c" among the users who receive the recommendation information on the action "x" provided by the information processing apparatus 10.

Next, the approximation performed in the known probability estimation unit 31 will be described. In Equation (1), the execution probability $P_c(x)$ may be approximated to a frequency at which the action "x" is executed by users who acquire no recommendation information in the context "c." The frequency at which the action "x" is executed by the users who acquire no recommendation information in the context "c" may be identified by referring to the records of the action history information 51. Further, when Equation (1) is transformed into an equation for calculating the known probability, Equation (2) is obtained.

$$P_c(kx) = \frac{P_c(x)}{P_c(x|kx)} \quad (2)$$

In Equation (2), the selection probability $P_c(x|kx)$ may be obtained by the selection probability estimation unit 32. Thus, the known probability estimation unit 31 determines the calculation result of Equation (2) to be the known probability of the action "x" in the context "c."

FIG. 7 is a view illustrating an example of a prediction of the selection probability and the known probability. Hereinafter, an example of the calculations performed by the known probability estimation unit 31 and the selection probability estimation unit 32 will be described by taking the case of FIG. 7 as an example.

A table T1 of FIG. 7 is an example of records extracted from the action history information 51 with regard to the users in the situation of being located in the castle AAA in the afternoon on a clear day (context C0002). In the example of FIG. 7, the recommending process in the context C0002 is performed 10 times. The example of FIG. 7 includes information on five processes selected by the users who acquire no recommendation information in the context C0002. In addition, it is assumed that the future destinations recommended in the context C0002 include the park WW (X0005) five times and the souvenir shop YY (X0002) the remaining five times. Meanwhile, it is assumed that the destinations selected by the users who acquire no recommendation information in the context C0002 include the restaurant ZZZ (X0003) one time, the park WW (X0005) two times, the souvenir shop YY (X0002) one time, and the location near the station AAA (X0000) the remaining one time. According to the table T1, the number of times the users to whom the park WW is recommended actually go to the park WW is three. Of the five times where it is recommended to go to the park WW in the context C0002, the number of times the park WW is selected as a future destination is three. Thus, the selection probability estimation unit 32 calculates the selection probability to be $P_c(x|kx)=3$ times/5 times=0.6. Further, of the five times where no recommended information is provided in the context C0002, the number of times the park WW is selected as a future destination is two. Thus, the known probability estimation unit 31 calculates the execution probability of the action of going to the park WW in the context C0002 to be $P_c(x)=2$ times/5 times=0.4. The known probability estimation unit 31 calculates the known probability as described below according to Equation (2), using the obtained execution probability and the obtained selection probability when the park WW is recommended in the context C0002.

$$P_c(kx) = \frac{P_c(x)}{P_c(x|kx)} = \frac{0.4}{0.6} = 0.67$$

A table T2 represents the execution probability, the selection probability, and the known probability obtained in the predicting processes by the known probability estimation unit 31 and the selection probability estimation unit 32.

The execution probability and others are identically calculated in a case where the souvenir shop YY is recommended as a destination. For example, of the five times where it is recommended to go to the souvenir shop YY in the context C0002, the number of times the souvenir shop YY is selected as a future destination is four. Thus, the selection probability estimation unit 32 calculates the selection probability to be $P_c(x|kx)=4$ times/5 times=0.8. Meanwhile, of the five records in which no recommendation information is acquired in the context C0002, the number of times the souvenir shop YY is selected as a future destination is one. Thus, the execution probability is calculated to be $P_c(x)=1$ time/5 times=0.2. Accordingly, the known probability estimation unit 31 calculates the known probability for the action of going to the souvenir shop YY in the context C0002 to be $P_c(kx)=P_c(x)/P_c(x)/P_c(x|kx)=0.2/0.8=0.25$.

The execution probability, the selection probability, and the known probability for the other contexts may be calculated by substantially similar processes as described above.

Figure 8:
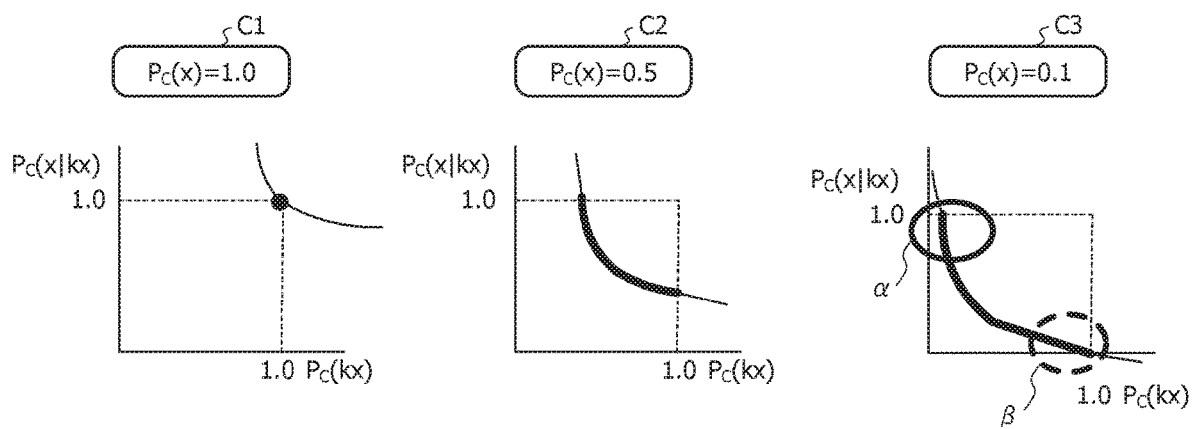
FIG. 8 is a view illustrating an example of a method of determining an object to be recommended.

FIG. 8 is a view illustrating an example of a method of determining a recommendation target. FIG. 8 illustrates a relationship between the known probability and the selection probability of the action "x," for each of a case where the execution probability of the action "x"=1.0, the execution probability=0.5, and the execution probability=0.1. For all of the graphs of FIG. 8, the horizontal axis represents the known probability $P_c(kx)$, and the vertical axis represents the selection probability $P_c(x|kx)$.

When the execution probability of the action "x"=1.0, a relationship of Equation (3) is established.

$$P_c(x)=1.0=P_c(kx) \times P_c(x|kx) \qquad (3)$$

Thus, as represented in a case C1, both the known probability and the selection probability are 1.0. The case C1 corresponds to, for example, a case where a regular route is preset or there exists a single route with no other choices. Accordingly, even though recommendation information is provided to the users in this case, the recommendation information may not be useful.

When the execution probability of the action "x"=0.5, a relationship of Equation (4) is established, and the known probability and the selection probability are represented as the graph of a case C2.

$$P_c(x)=0.5=P_c(kx) \times P_c(x|kx) \qquad (4)$$

When the execution probability of the action "x"=0.1, a relationship of Equation (5) is established, and the known probability and the selection probability are represented as the graph of a case C3.

$$P_c(x)=0.1=P_c(kx) \times P_c(x|kx) \qquad (5)$$

Here, in a region β of the graph of the case C3, the known probability is relatively high, whereas the selection probability is relatively low. Accordingly, it may be said that the action "x" having a value plotted in the region β is an action which is known to everyone but is hardly selected. For example, recommending a store which is located in a main street but is not popular corresponds to recommending the action of the region β. Accordingly, the action associated with a value plotted in the region β is not useful information even though the action is recommended.

Meanwhile, the action "x" having a value plotted in a region α is little known but may be highly likely to be selected when the action is recommended. For example, recommending a restaurant which is less known because of being located on a back street but has a good reputation corresponds to recommending the action of the region α. Accordingly, the action associated with a value plotted in the region α is information useful for users when the action is recommended.

The recommendation information generator 24 may determine the action plotted in the region α of the case C3 of FIG. 8 to be a recommendation target, using the calculation results of the known probability estimation unit 31 and the selection probability estimation unit 32. For example, the recommendation information generator 24 stores thresholds Th1 and Th2 in advance, and determines an action of which known probability is equal to or lower than the threshold Th1 and selection probability is equal to or higher than the threshold Th2, to be a recommendation target. The recommendation information generator 24 generates recommendation information for notifying the recommendation target action to the user of the terminal 1. In addition, when a plurality of actions is determined to be recommendation targets as a result of the threshold processing, the recommendation information generator 24 may include all of the obtained recommendation targets in the recommendation information. In addition, the recommendation information generator 24 may include one recommendation target selected from the plurality of obtained recommendation targets, in the recommendation information. In this case, a method of selecting an object to be included in the recommendation information by the recommendation information generator 24 may be arbitrarily set according to an implementation. For example, the recommendation information generator 24 may include information randomly selected from the plurality of obtained recommendation targets, in the recommendation information.

(3) Example of Recommendation Control

Figure 9:
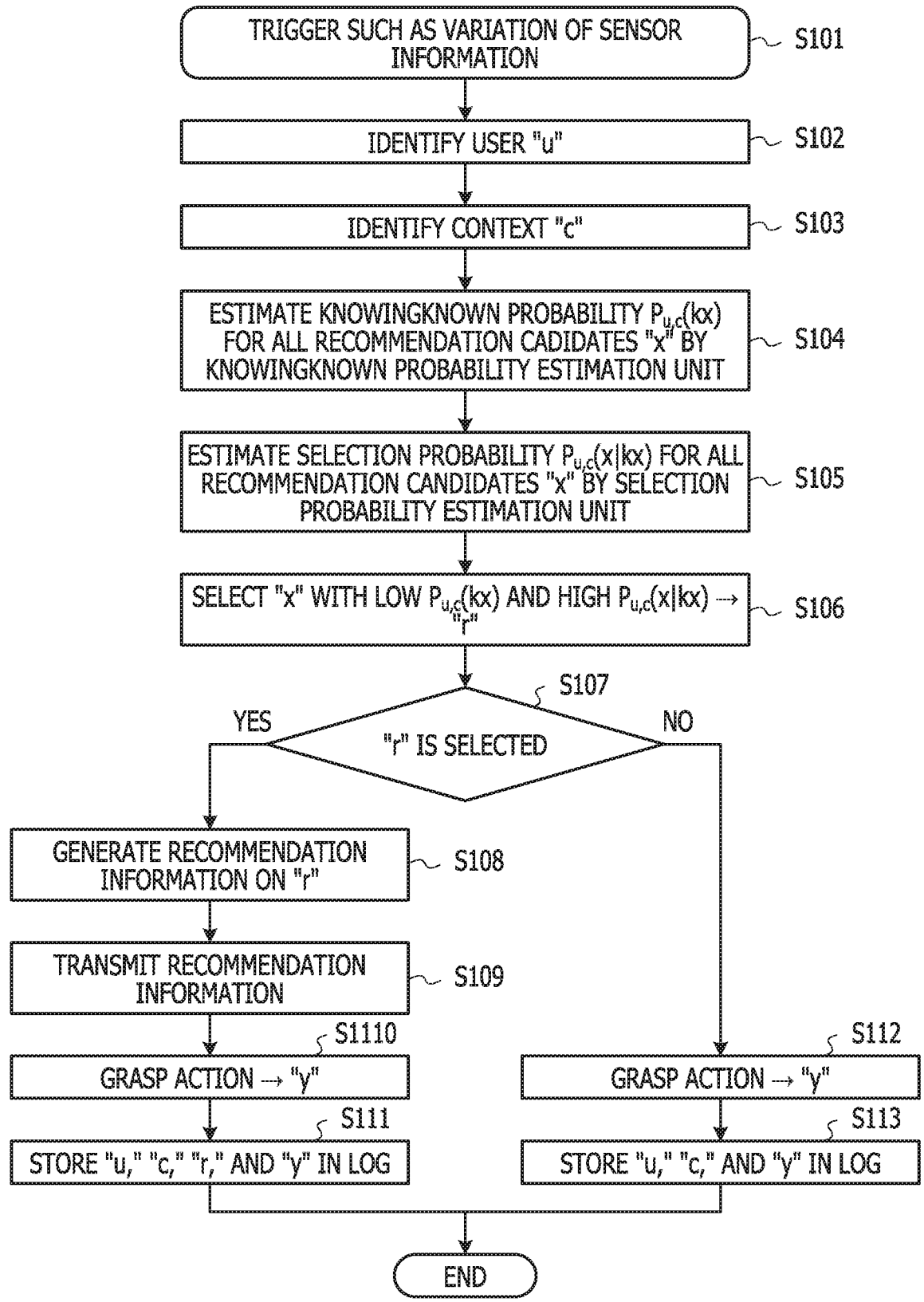
FIG. 9 is a flowchart illustrating an example of a recommendation control method according to a first embodiment.

FIG. 9 is a flowchart illustrating an example of a recommendation control method according to the first embodiment. In FIG. 9, five variables "u," "c," "x," "r," and "y" are used. The variable "u" refers to a user to whom recommendation information is provided. The variable "c" refers to a situation (context). The variable "x" refers to an action recorded in association with a context in the action history information 51. The variable "r" refers to an action selected as an object to be recommended to the user among actions represented by the variable "x." The variable "y" refers to an action taken by the user who has received recommendation information.

It is assumed that the input unit 16 of the information processing apparatus 10 receives notification information that notifies an occurrence of a trigger such as, for example, a change in sensor information obtained in the terminal 1 (step S101). Here, the notification information includes information for identifying the user of the terminal 1, the sensor data and others. The user identification unit 21 identifies the user "u" (step S102). The context acquisition unit 22 identifies the context "c," using the obtained sensor data, a timing when the notification is received, and others (step S103). The identifying unit 23 searches the action history information 51 using the obtained context as a key, and identifies actions which become recommendation candidates "x." Then, the known probability estimation unit 31 estimates the known probabilities $P_{u,c}(kx)$ for all of the recommendation candidates "x" (step S104). The selection probability estimation unit 32 estimates the selection probabilities $P_{u,c}(x|kx)$ for all of the recommendation candidates "x" (step S105). The recommendation information generator 24 selects a recommendation candidate "x" having the relatively low known probability $P_{u,c}(kx)$ and the relatively high selection probability $P_{u,c}(x|kx)$ as a recommendation target "r" (step S106).

The recommendation information generator 24 determines whether the recommendation target "r" has been selected (step S107). When it is determined that the recommendation target "r" has been selected, the recommendation information generator 24 generates recommendation information on the recommendation target "r" (Yes in step S107, step S108). The output unit 17 transmits the generated recommendation information to the terminal 1 (step S109).

After the process of step S109, the analyzer 41 monitors and analyzes information received from the terminal 1 via the input unit 16. The analyzer 41 grasps an action taken by the user of the terminal 1 by analyzing the sensor data or the like, and determines the grasped action to be the action "y" (step S110). For example, the analyzer 41 may grasp the position of the terminal 1 by using GPS (global positioning system) data or the like acquired from the terminal 1 to which the recommendation information has been transmitted, and identify a destination selected by the user of the terminal 1. The update processing unit 42 updates the action history information 51 by storing the information of the action "y" obtained by the analyzer 41, together with the user information "u," the context "c," and the recommendation target "r," in the action history information 51 (step S111).

Meanwhile, it is assumed that the recommendation target "r" has not been selected in step S107 (No in step S107). In this case as well, the analyzer 41 analyzes the information received from the terminal 1 via the input unit 16, and identifies the action "y" taken by the user of the terminal 1 (step S112). The update processing unit 42 updates the action history information 51 by storing the information of the action "y" obtained by the analyzer 41, together with the user information "u" and the context "c," in the action history information 51 (step S113).

In addition, the process of FIG. 9 is an example, and the order of performing the process may be changed according to an implementation. For example, the order of steps S102 and S103 may be arbitrarily changed. Further, the order of steps S104 and S105 may be changed.

As described above, when the first embodiment is used, it is possible to provide information which is less likely to be known to the user of the terminal 1 but is highly likely to be selected when the information is recommended. That is, the information processing apparatus 10 may provide the user with information predicted to be useful, as information to be recommended to the terminal 1.

Second Embodiment

In a second embodiment, descriptions will be made on a case where the user attribute information 52 is used for selecting information which is highly valuable for the user.

FIG. 10 is a view illustrating an example of the user attribute information 52. The user attribute information 52 records an index value indicating the strength of interest of each user for one category or each of a plurality of categories which is usable for classifying recommendation information, in association with identification information of the user. The example illustrated in FIG. 10 includes categories such as sports, art, gourmet, history, architecture, nature, and others. In the user attribute information 52, the interest strength for each category is represented using values of 0 to 1, and a relatively large index value represents a relatively strong interest of the user. For example, the user with the user ID of 00001 has the strongest interest in gourmet, and the second strongest interest in sports. Meanwhile, the user with the user ID of 00002 has a strong interest in architecture or history, and has little interest in sports or art. In addition, the information included in the user attribute information 52 may be used as attribute vectors representing the interest of each user.

Figure 11:
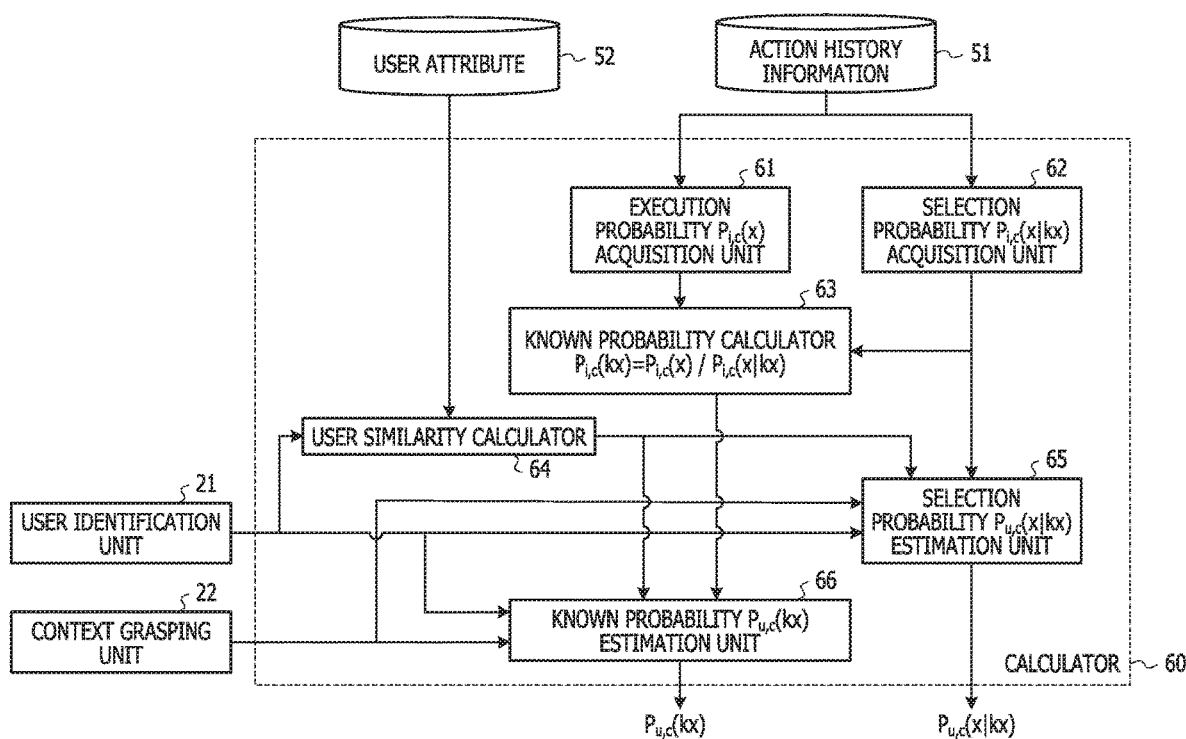
FIG. 11 is a view illustrating an example of a calculator according to a second embodiment.

FIG. 11 is a view illustrating an example of a calculator 60 according to the second embodiment. In the information processing apparatus 10 according to the second embodiment, the calculator 60 capable of calculating a similarity among users is used, instead of the calculator 30. In the second embodiment as well, the operations of the user identification unit 21, the context acquisition unit 22, the identifying unit 23, and the action grasping unit 40 are substantially similar to those in the first embodiment.

The calculator 60 includes an execution probability acquisition unit 61, a selection probability acquisition unit 62, a known probability calculator 63, a user similarity calculator 64, a selection probability estimation unit 65, and a known probability estimation unit 66. The execution probability acquisition unit 61 refers to the action history information 51, and calculates the probability $P_{i,c}(x)$ that each user will execute the action "x" of the recommendation target in the context "c." The selection probability acquisition unit 62 refers to the action history information 51, and calculates the probability $P_{i,c}(x|kx)$ that each user will select the action "x" of the recommendation target when the user knows the action "x" in the context "c." The known probability calculator 63 calculates the known probability $P_{i,c}(kx)$ for each user, using the calculation results obtained by the execution probability acquisition unit 61 and the selection probability acquisition unit 62. The user similarity calculator 64 calculates the similarity in interest among users (user similarity) by using the user attribute information 52. The selection probability estimation unit 65 estimates the selection probability $P_{u,c}(x|kx)$ for the user "u" to whom recommendation information is provided, using the user similarity and the selection probability for each user. The known probability estimation unit 66 estimates the known probability $P_{u,c}(kx)$ for the user "u" to whom recommendation information is provided, using the user similarity and the known probability for each user.

The selection probability calculated in the selection probability estimation unit 65 and the known probability calculated in the known probability estimation unit 66 are output to the recommendation information generator 24. The recommendation information generator 24 selects an action to be recommended, using the known probability and the selection probability that have been input, and generates recommendation information. The process in the recommendation information generator 24 is substantially similar to that in the first embodiment.

In addition, FIG. 11 represents an example of data input/output for obtaining the known probability and the selection probability, using arrows. However, data input/output may also be performed in directions other than the directions indicated by the arrows or between regions which are not indicated by arrows.

Figure 12:
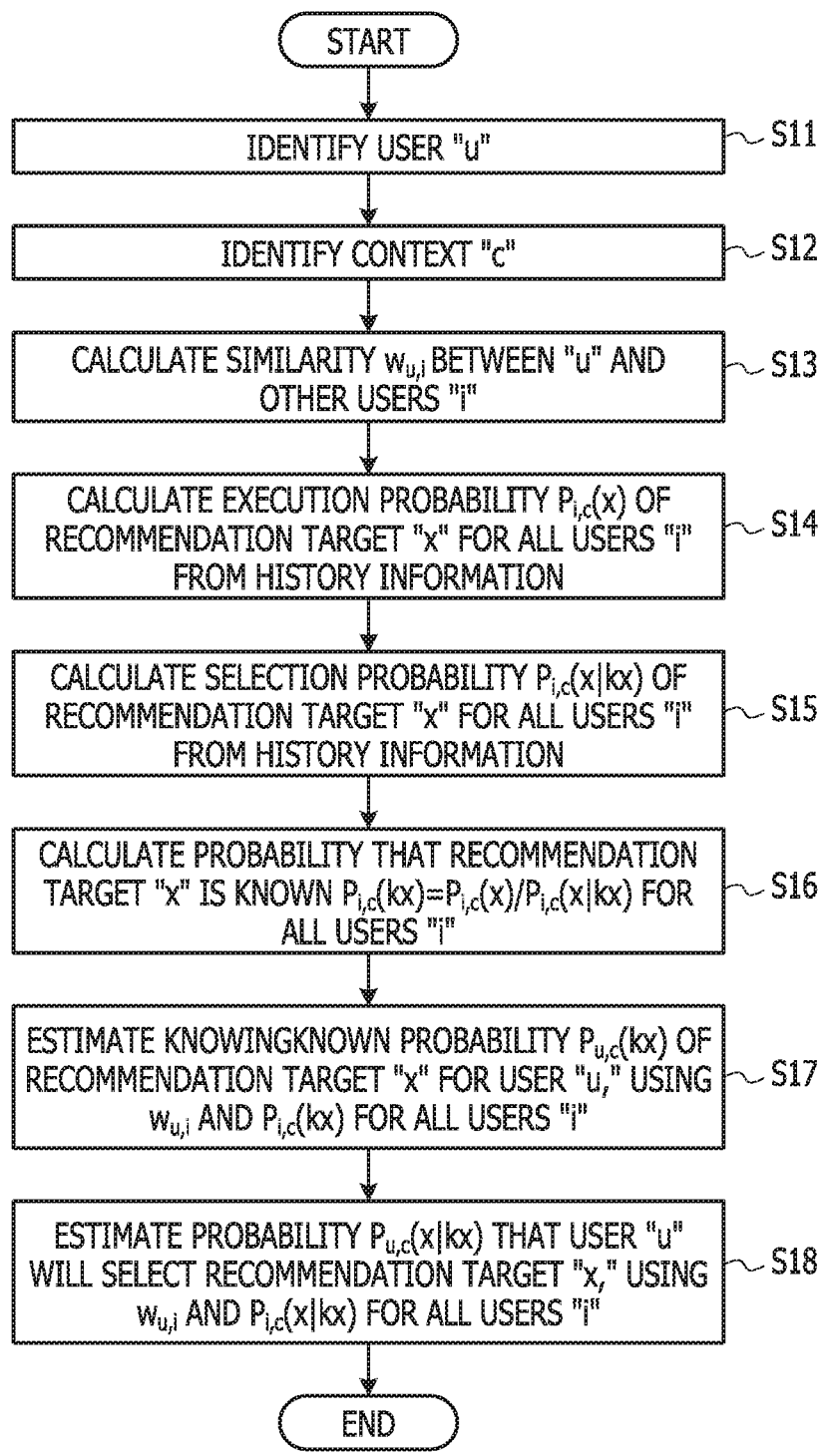
FIG. 12 is a flowchart illustrating an example of a process according to the second embodiment.

FIG. 12 is a flowchart illustrating an example of the process according to the second embodiment. In addition, the process of FIG. 12 is an example, and the order of the process may be changed according to an implementation. For example, the order of steps S11 and S12 may be arbitrarily changed. The order of steps S13 to S15 may also be arbitrarily changed. Further, the order of steps S17 and S18 may be changed with each other.

The user identification unit 21 identifies the user "u" (step S11). The context acquisition unit 22 identifies the context "c" using information obtained from the terminal 1 or information on a timing when the information is received from the terminal 1 (step S12). In addition, the process of identifying the user "u," the context "c" or the like is substantially similar to that in the first embodiment.

The user similarity calculator 64 calculates similarities $w_{u,i}$ between the user "u" and other users "i," using the user attribute information 52 (step S13). Here, for example, the similarity $w_{u,i}$ between the user "u" and each of other users "i" may be calculated by an inner product $S(a_u, a_i)$ of an attribute vector $a_u$ obtained for the user "u" and an attribute vector $a_i$ obtained for the user "i."

The execution probability acquisition unit 61 calculates the execution probabilities $P_{i,c}(x)$ of the recommendation target "x" for all users "i" from the history information (step S14). The selection probability acquisition unit 62 calculates the probabilities $P_{i,c}(x|kx)$ of selecting the recommendation target "x" for all of the users "i" from the history information (step S15). The known probability calculator 63 calculates the known probability $P_{i,c}(kx)$ of the recommendation target "x" for each user, using the calculation results from the execution probability acquisition unit 61 and the selection probability acquisition unit 62 (step S16). In step S16, the known probability is calculated from Equation (6).

$$P_{i,C}(kx) = \frac{P_{i,C}(x)}{P_{i,C}(x|kx)} \tag{6}$$

The known probability estimation unit 66 estimates the known probability $P_{u,c}(kx)$ of the recommendation target "x" for the user "u," using the user similarities $w_{u,i}$ between all of the users "i" and the user "u" and the known probabilities $P_{i,c}(kx)$ for the users "i" (step S17). At this time, the known probability estimation unit 66 estimates the known probability $P_{u,c}(kx)$ for the user "u," by calculating a weighted average of the known probabilities of the respective users "i" using the similarities between the user "u" to which recommendation information is notified and other users "i" according to Equation (7).

$$P_{u,C}(kx) = \frac{\sum_i (w_{u,i} \times P_{i,C}(kx))}{\sum_i w_{u,i}} \tag{7}$$

In addition, in Equation (7), the similarity $w_{u,i}$ is $S(a_u, a_i)$. Since the weighted average is calculated as represented in Equation (7), the known probability estimation unit 66 predicts that an action known to a user "i" who has a similar interest to the user "u" is highly likely to be known to the user "u." Meanwhile, the prediction values of the known probability also reflect a case where an action known to a user "i" who does not have a similar interest to the user "u" may be unknown to the user "u."

The selection probability estimation unit 65 estimates the selection probability $P_{u,c}(x|kx)$ of the recommendation target "x" for the user "u," using the user similarities $w_{u,i}$ between all of the users "i" and the user "u" and the selection probabilities $P_{i,c}(x|kx)$ for the users "i" (step S18). At this time, the selection probability estimation unit 65 estimates the selection probability $P_{u,c}(x|kx)$, by calculating a weighted average of the selection probabilities of the respective users "i" using the similarities between the user "u" to which recommendation information is notified and other users "i" according to Equation (8).

$$P_{u,C}(x|kx) = \frac{\sum_i (w_{u,i} \times P_{i,C}(x|kx))}{\sum_i w_{u,i}} \tag{8}$$

Since the weighted average is calculated as represented in Equation (8), the selection probability estimation unit 65 predicts that an action highly likely to be selected by a user "i" who has a similar interest to the user "u" is highly likely to be selected by the user "u." Meanwhile, the prediction values of the selection probability also reflect a case where an action which is easily selected by a user "i" who does not have a similar interest to the user "u" may be hardly selected by the user "u" because the action is less attractive to the user "u."

Further, the recommendation information generator 24 generates recommendation information, using the selection probability and the known probability obtained in the process represented in the flowchart of FIG. 12. Here, in the second embodiment, the selection probability is calculated using Equation (8) to approach the selection probability of a user "i" who has a similar attribute to the user "u." Similarly, the known probability is calculated using Equation (7) to approach the known probability of the user "i" who has a similar attribute to the user "u." The recommendation information generator 24 generates recommendation information which is highly likely to be unknown to the user "u" and is highly likely to be selected by the user "u," using the obtained selection probability and known probability. Accordingly, in the second embodiment, it is possible to generate recommendation information which is more suitable for the preference of the user "u," as compared to the first embodiment.

Third Embodiment

Figure 13:
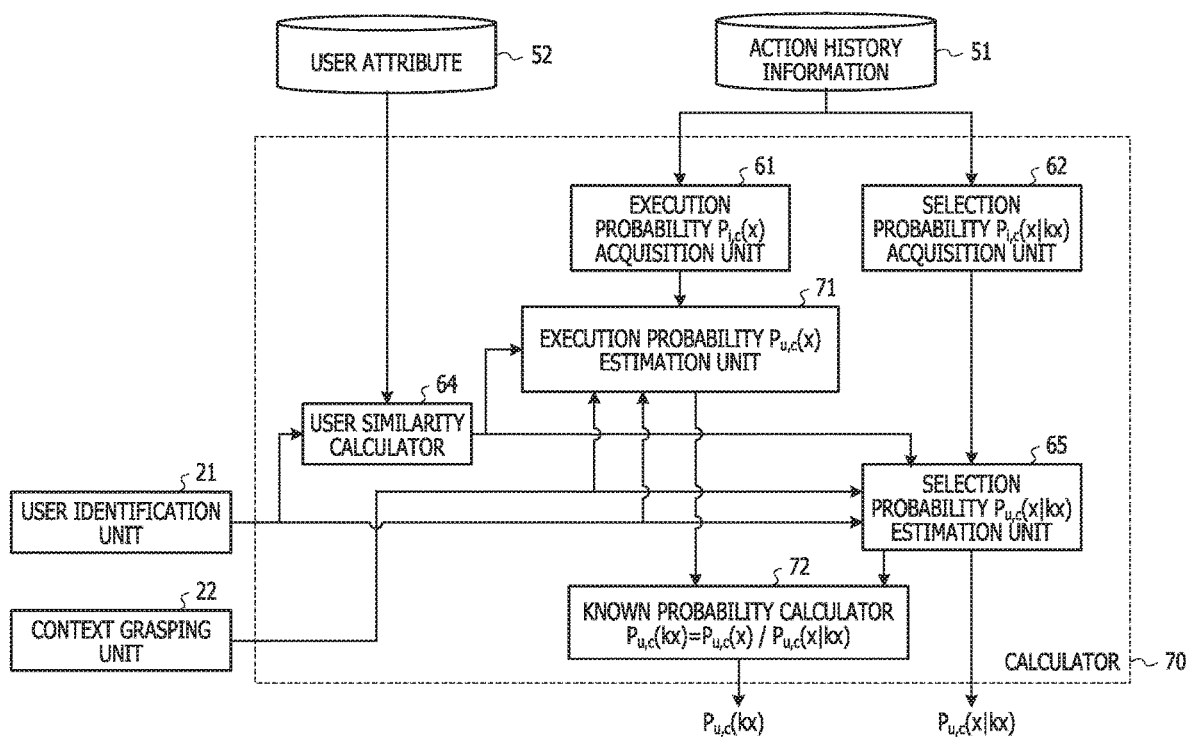
FIG. 13 is a view illustrating an example of a calculator according to a third embodiment.

FIG. 13 is a view illustrating an example of a calculator 70 according to a third embodiment. The calculator 70 includes the execution probability acquisition unit 61, the selection probability acquisition unit 62, the user similarity calculator 64, the selection probability estimation unit 65, an execution probability estimation unit 71, and a known probability calculator 72. The processes performed by the execution probability acquisition unit 61, the selection probability acquisition unit 62, the user similarity calculator 64, and the selection probability estimation unit 65 are substantially similar to those in the second embodiment.

The execution probability estimation unit 71 estimates the execution probability $P_{u,c}(x)$ for the user "u" to whom recommendation information is provided, using the execution probability $P_{i,c}(x)$ calculated for each user "i" in the execution probability acquisition unit 61, and the user similarity. At this time, the execution probability estimation unit 71 may perform a weighting using, for example, Equation (9).

$$P_{u,C}(x) = \frac{\sum_i (w_{u,i} \times P_{i,C}(x))}{\sum_i w_{u,i}} \tag{9}$$

When the weighting is performed using Equation (9), the execution probability estimation unit 71 predicts that an action highly likely to be executed by a user "i" who has a similar interest to the user "u" is highly likely to be executed by the user "u." Meanwhile, the prediction values of the execution probability also reflect a case where an action which is easily executed by a user "i" who does not have a similar interest to the user "u" may be hardly executed by the user "u" because the action is less attractive to the user "u."

The known probability calculator 72 calculates the known probability $P_{u,c}(kx)$), using the execution probability calculated for the user "u" in the execution probability estimation unit 71. Here, the execution probability calculated in the execution probability estimation unit 71 is a value calculated by reflecting the interest or the like of the user "u." Thus, the known probability calculated for the user "u" in the known probability calculator 72 is a value which reflects the interest of the user "u," or the like, and thus, approaches the known probability for the user "i" who has a similar index value for the interest or the like to the user "u."

The selection probability calculated in the selection probability estimation unit 65 and the known probability calculated by the known probability calculator 72 are output to the recommendation information generator 24. The recommendation information generator 24 selects an action to be recommended, using the known probability and the selection probability that have been input, and generates recommendation information. The process in the recommendation information generator 24 is substantially similar to that in the first embodiment.

In addition, FIG. 13 represents an example of data input/output for obtaining the known probability and the selection probability, using arrows. However, data input/output may also be performed in directions other than the directions indicated by the arrows or between regions which are not connected by arrows.

Figure 14:
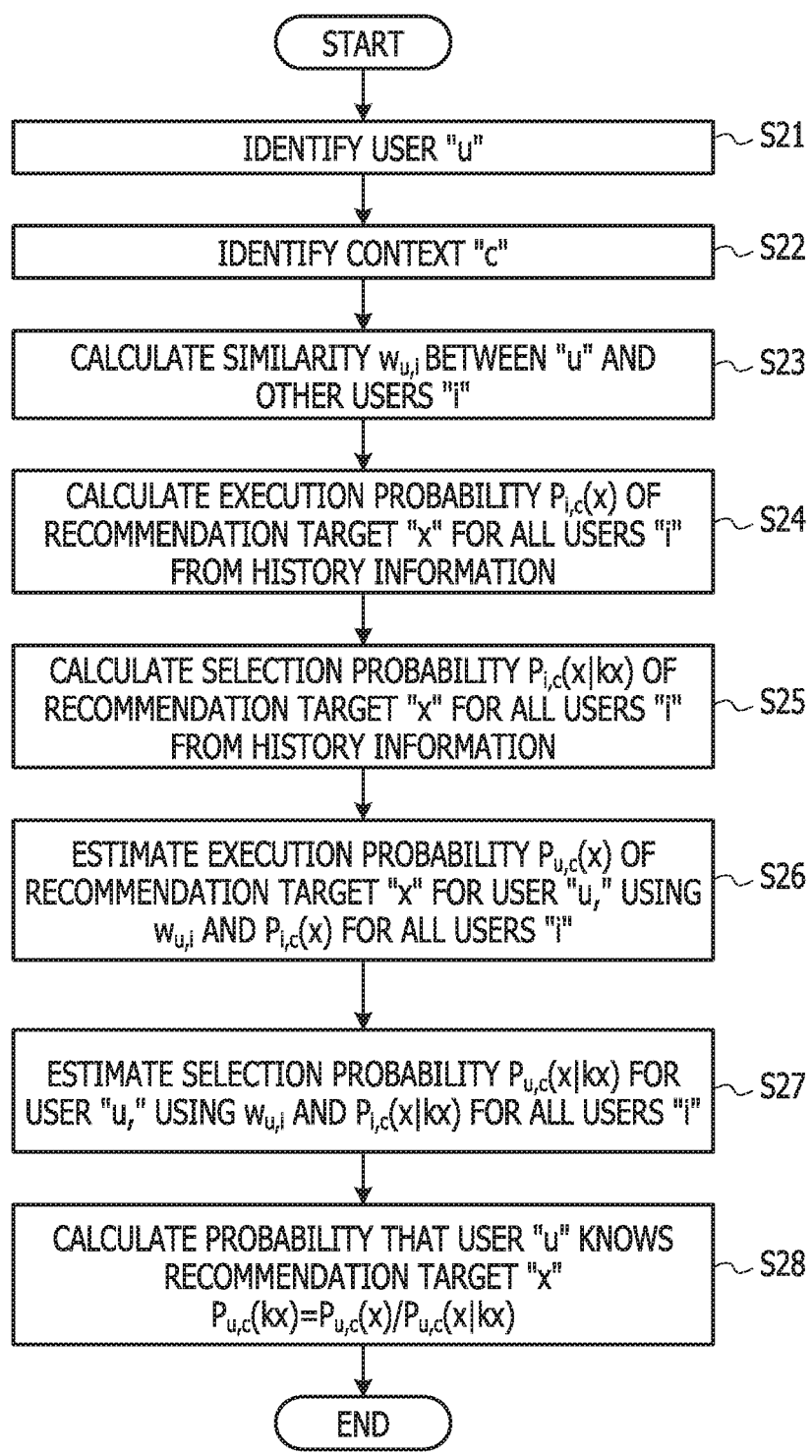
FIG. 14 is a flowchart illustrating an example of a process according to the third embodiment.

FIG. 14 is a flowchart illustrating an example of the process according to the third embodiment. The processes of steps S21 to S25 of FIG. 14 are substantially similar to those of steps S11 to S15 described above with reference to FIG. 12.

The execution probability estimation unit 71 estimates the execution probability $P_{u,c}(x)$ of the recommendation target "x" for the user "u," using the user similarities $w_{u,i}$ between all of the users "i" and the user "u" and the execution probabilities $P_{i,c}(x)$ for the users "i" (step S26). At this time, the execution probability estimation unit 71 estimates the execution probability $P_{u,c}(x)$, by calculating a weighted average of the execution probabilities of the respective users "i" using the similarities between the user "u" to which recommendation information is notified and other users "i" according to Equation (10).

$$P_{u,C}(x) = \frac{\sum_i (w_{u,i} \times P_{i,C}(x))}{\sum_i w_{u,i}} \quad (10)$$

In addition, in Equation (10), the similarity $w_{u,i}$ is $S(a_u, a_i)$. Since the weighted average is calculated by Equation (10), it is predicted that an action which is easily executed by a user "i" who has a similar interest to the user "u" is highly likely to be executed by the user "u." Meanwhile, the prediction values of the execution probability also reflect a case where an action highly likely to be executed by the user "i" who does not have a similar interest to the user "u" is less likely to be executed by the user "u."

The selection probability estimation unit 65 estimates the selection probability $P_{u,c}(x|kx)$ of the recommendation target "x" for the user "u," using the user similarities $w_{u,i}$ between all of the users "i" and the user "u" and the selection probabilities $P_{i,c}(x|kx)$ for the users "i" (step S27). The process of step S27 is substantially similar to the process of step S18. Thus, it is predicted that an action highly likely to be selected by a user "i" who has a similar interest to the user "u" is highly likely to be selected by the user "u."

The known probability calculator 72 calculates the probability that the user "u" knows the recommendation target "x," from Equation (11) using the execution probability obtained in step S26 and the selection probability obtained in step S27 (step S28).

$$P_{u,C}(kx) = \frac{P_{u,C}(x)}{P_{u,C}(x|kx)} \quad (11)$$

In addition, the process of FIG. 14 is an example, and the order of the process may be changed according to an implementation. For example, the order of steps S21 and S22 may be arbitrarily changed. The order of steps S23 to S25 may also be arbitrarily changed.

In the third embodiment as well, the selection probability and the execution probability may be obtained in consideration of the interest of the user, as in the second embodiment. Thus, in the third embodiment as well, it is possible to generate recommendation information which is suitable for the preference of the user "u." Further, in the third embodiment, the known probability is not calculated for all of the users, but is calculated only for the user "u." Thus, in the third embodiment, the calculation amount may be reduced, as compared to the second embodiment, so that the processing load of the information processing apparatus 10 may be reduced.

Fourth Embodiment

Figure 15:
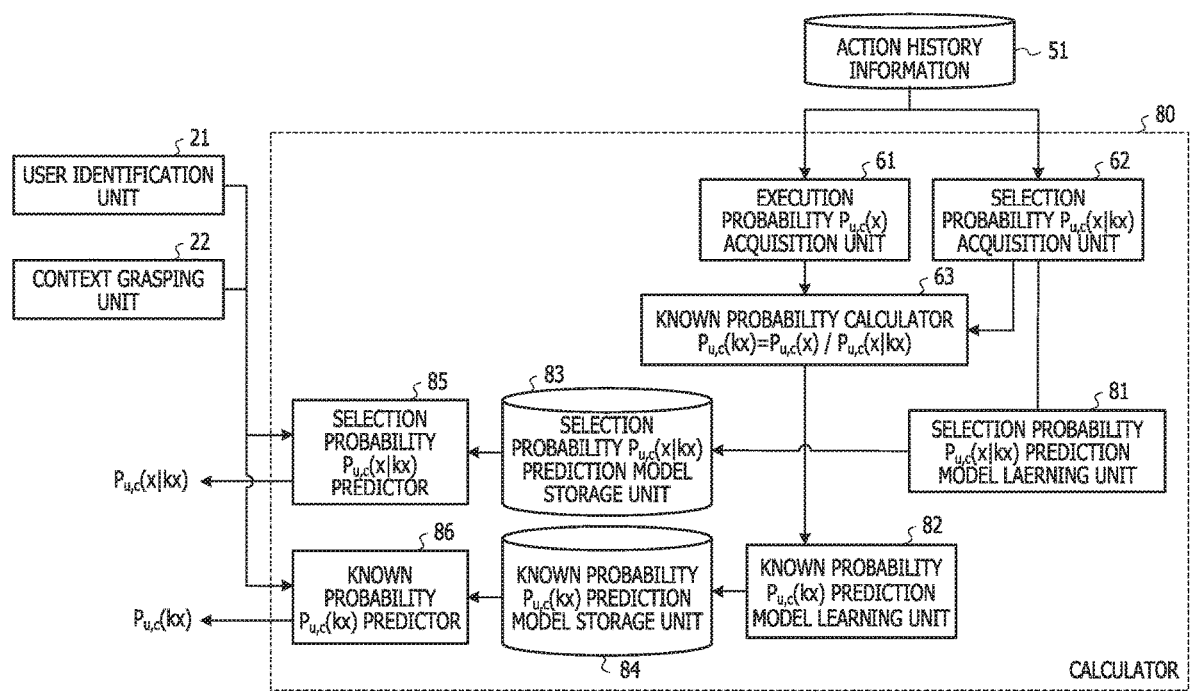
FIG. 15 is a view illustrating an example of a calculator according to a fourth embodiment.

FIG. 15 is a view illustrating an example of a calculator 80 according to a fourth embodiment. The calculator 80 includes a selection probability prediction model learning unit 81, a known probability prediction model learning unit 82, a selection probability prediction model storage unit 83, a known probability prediction model storage unit 84, a selection probability predictor 85, and a known probability predictor 86. In addition, the selection probability prediction model storage unit 83 and the known probability prediction model storage unit 84 of the calculator 80 may be implemented by the memory 102 and the storage device 106 (FIG. 3). The calculator 80 further includes the execution probability acquisition unit 61, the selection probability acquisition unit 62, and the known probability calculator 63. The processes performed in the execution probability acquisition unit 61, the selection probability acquisition unit 62, and the known probability calculator 63 are substantially similar to those in the second embodiment.

The selection probability prediction model learning unit 81 generates a selection probability prediction model by machine learning of the value of the selection probability obtained in the selection probability acquisition unit 62. In addition, any well-known method may be applied as the method of the learning process for generating the selection probability prediction model. The selection probability prediction model is a model capable of outputting a prediction value of a probability that a user identified by a user ID according to the input of the user ID will select the action "x" in the context "c." The selection probability prediction model learning unit 81 stores the generated selection probability prediction model in the selection probability prediction model storage unit 83.

The known probability prediction model learning unit 82 generates a known probability prediction model by machine learning of the value of the known probability obtained in the known probability calculator 63. In addition, any well-known method may be applied as the method of the learning process for generating the known probability prediction model. The known probability prediction model is a model capable of outputting a prediction value of a probability that a user identified by a user ID according to the input of the user ID recognizes an action "x" as a choice in the context "c" (known probability). The known probability prediction model learning unit 82 stores the generated known probability prediction model in the known probability prediction model storage unit 84.

The selection probability predictor 85 obtains a prediction value of the selection probability using the selection probability prediction model. The known probability predictor 86 obtains a prediction value of the known probability using the known probability prediction model. In addition, it is assumed that information of a user to whom recommendation information is provided is input from the user identification unit 21 to the selection probability predictor 85 and the known probability predictor 86, and the context "c" representing the situation of the user "u" is input from the context acquisition unit 22 to the selection probability predictor 85 and the known probability predictor 86.

The selection probability predicted in the selection probability predictor 85 and the known probability predicted in the known probability predictor 86 are output to the recommendation information generator 24. The recommendation information generator 24 selects an action to be recommended, using the input known probability and selection probability, and generates recommendation information. The process performed in the recommendation information generator 24 is substantially similar to that in the first embodiment.

In addition, FIG. 15 represents an example of data input/output when the known probability prediction model and the selection probability prediction model are generated, and an example of data input/output when the predicting process is performed using the obtained known probability prediction model and selection probability prediction model, using arrows for facilitating the understanding of descriptions. The data input/output may also be performed in directions other than the directions indicated by the arrows in FIG. 15 or between regions which are not connected by the arrows.

Figure 16:
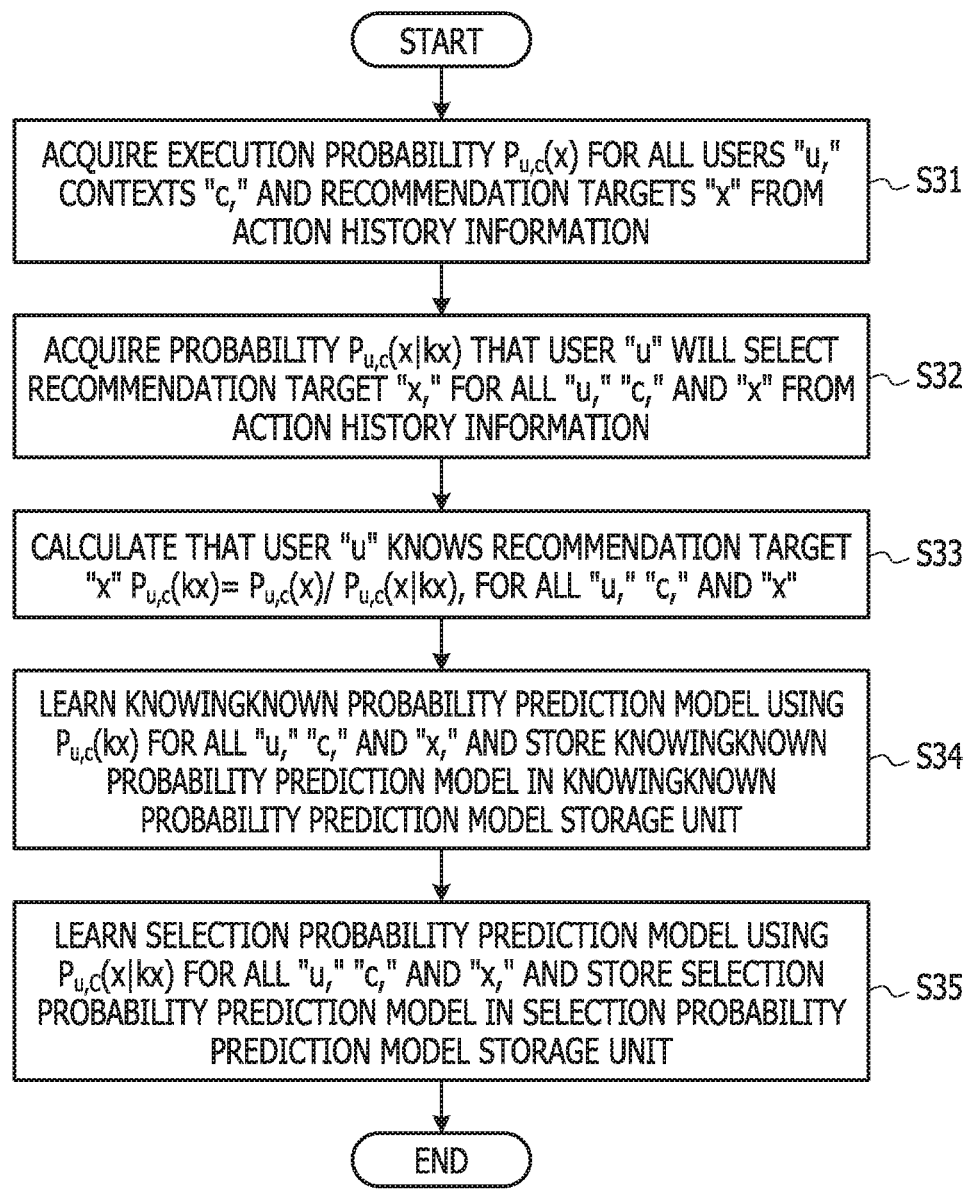
FIG. 16 is a flowchart illustrating an example of a learning process in the fourth embodiment.

FIG. 16 is a flowchart illustrating an example of the learning process according to the fourth embodiment. In addition, the process of FIG. 16 is an example, and the order of the process may be changed according to an implementation. For example, the order of steps S31 and S32 may be arbitrarily changed, or steps S31 and S32 may be performed in parallel. Further, the order of steps S34 and S35 may be changed with each other, or steps S34 and S35 may be performed in parallel.

The execution probability acquisition unit 61 acquires the execution probabilities $P_{u,c}(x)$ for all users "u," contexts "c," and recommendation targets "x" from the action history information 51 (step S31). The selection probability acquisition unit 62 acquires the selection probabilities $P_{u,c}(x|kx)$ for all users "u," contexts "c," and recommendation targets "x" from the action history information 51 (step S32). The known probability calculator 63 calculates the known probabilities $P_{u,c}(kx)$ for all users "u," contexts "c," and recommendation targets "x," using the execution probabilities calculated in the execution probability acquisition unit 61 and the selection probabilities calculated in the selection probability acquisition unit 62 (step S33). In step S33, the known probability is calculated by Equation (12).

$$P_{u,C}(kx) = \frac{P_{u,C}(x)}{P_{u,C}(x|kx)} \tag{12}$$

The known probability prediction model learning unit 82 learns the known probability prediction model, using the known probabilities $P_{u,c}(kx)$ for all users "u," contexts "c," and recommendation targets "x," and stores the obtained known probability prediction model in the known probability prediction model storage unit 84 (step S34). Meanwhile, the selection probability prediction model learning unit 81 learns the selection probability prediction model, using the selection probabilities $P_{u,c}(x|kx)$ for all users "u," contexts "c," and recommendation targets "x," and stores the obtained selection probability prediction model in the selection probability prediction model storage unit 83 (step S35).

Figure 17:
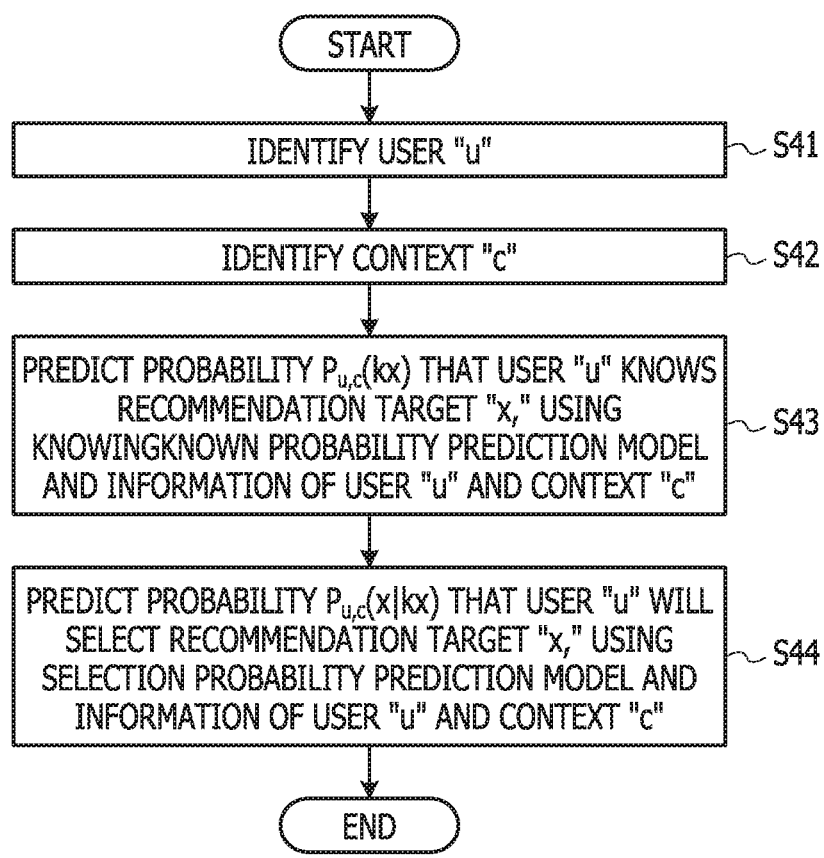
FIG. 17 is a flowchart illustrating an example of a predicting process in the fourth embodiment.

FIG. 17 is a flowchart illustrating an example of the predicting process according to the fourth embodiment. In addition, the process of FIG. 17 is an example, and the order of the process or the like may be changed according to an implementation. For example, the order of steps S41 and S42 may be arbitrarily changed, or steps S41 and S42 may be performed in parallel. Further, the order of steps S43 and S44 may be arbitrarily changed, or steps S43 and S44 may be performed in parallel.

The user identification unit 21 identifies the user "u" (step S41). The context acquisition unit 22 identifies the context "c" using information obtained from the terminal 1 or information on a timing when the information is received from the terminal 1 (step S42). In addition, the process of identifying the user "u," the context "c" and others is substantially similar to that in the first embodiment.

The known probability predictor 86 predicts the probability $P_{u,c}(kx)$ that the user "u" knows the recommendation target "x," using the known probability prediction model and the information of the user "u" and the context "c" (step S43). The selection probability predictor 85 predicts the probability $P_{u,c}(x|kx)$ that the user "u" will select the recommendation target "x," using the selection probability prediction model and the information of the user "u" and the context "c" (step S44).

Then, the recommendation information generator 24 generates recommendation information, using the selection probability and the known probability obtained by the process represented in the flowchart of FIG. 17. Here, in the fourth embodiment, the known probability and the selection probability for the action "x" of the user "u" in the context "c" may be predicted with a high accuracy by using the known probability prediction model and the selection probability prediction model generated by the machine learning. By using the known probability and the selection probability predicted with the high accuracy, it is possible to accurately predict the action that is highly likely to be unknown to the user "u" and is highly likely to be selected by the user "u" when the action is known in the context "c." That is, when the fourth embodiment is used, the action plotted in the region "α" of FIG. 8 may be determined to be a recommendation target. Thus, according to the fourth embodiment, it is possible to provide information useful for the user "u."

Fifth Embodiment

Figure 18:
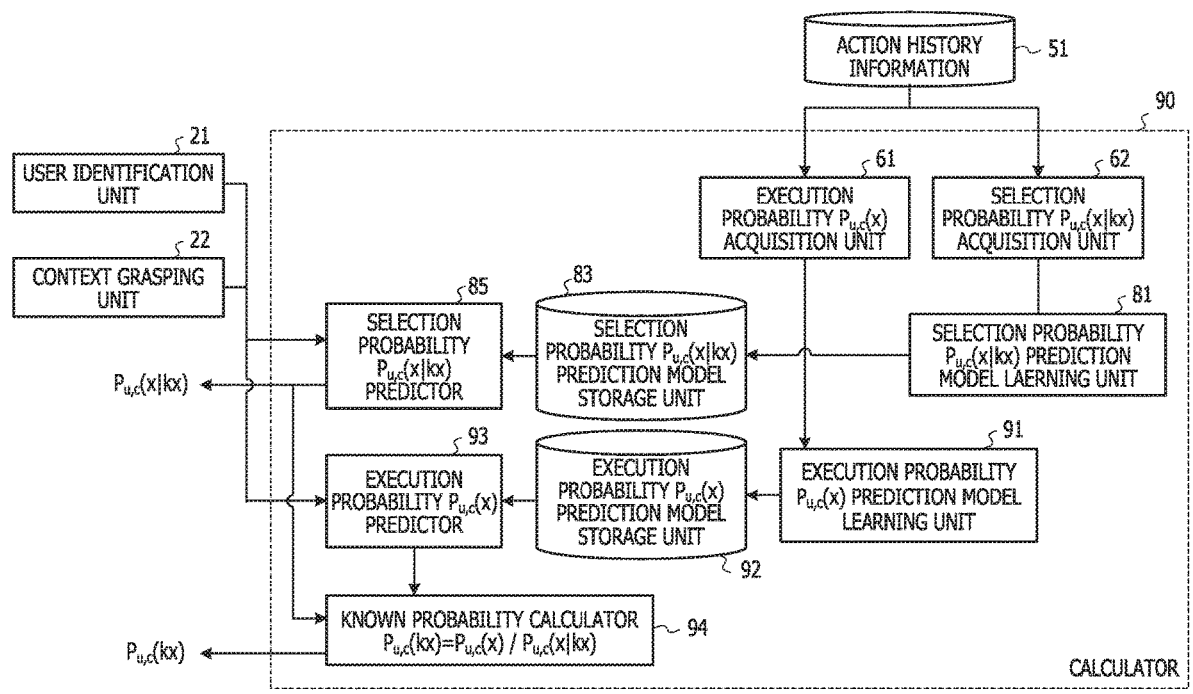
FIG. 18 is a view illustrating an example of a calculator according to a fifth embodiment.

FIG. 18 is a view illustrating an example of a calculator 90 according to a fifth embodiment. The calculator 90 includes an execution probability prediction model learning unit 91, an execution probability prediction model storage unit 92, an execution probability predictor 93, and a known probability calculator 94. Further, the calculator 90 includes the execution probability acquisition unit 61, the selection probability acquisition unit 62, the selection probability prediction model learning unit 81, the selection probability prediction model storage unit 83, and the selection probability predictor 85. The processes performed in the execution probability acquisition unit 61 and the selection probability acquisition unit 62 are substantially similar to those in the second embodiment. Further, the processes performed in the selection probability prediction model learning unit 81, the selection probability prediction model storage unit 83, and the selection probability predictor 85 are substantially similar to those in the fourth embodiment.

The execution probability prediction model learning unit 91 generates an execution probability prediction model by machine learning of the value of the execution probability obtained by the execution probability acquisition unit 61. In addition, any well-known method may be applied as the method of the learning process for generating the execution probability prediction model. The execution probability prediction model is a model capable of outputting a prediction value of the probability that a user identified by a user ID according to the input of the user ID will execute the action "x" in the context "c." The execution probability prediction model learning unit 91 stores the generated execution probability prediction model in the execution probability prediction model storage unit 92. In addition, the execution probability prediction model storage unit 92 may be implemented by the memory 102 and the storage device 106 (FIG. 3).

The execution probability predictor 93 obtains a prediction value of the execution probability, using the execution probability prediction model. It is assumed that information of a user to whom recommendation information is provided is input from the user identification unit 21 to the execution probability predictor 93, and the context "c" representing the situation of the user "u" is input from the context acquisition unit 22 to the execution probability predictor 92. The execution probability predictor 93 outputs the predicted value of the execution probability to the known probability calculator 94.

The known probability calculator 94 acquires the prediction value of the execution probability $P_{u,c}(x)$ from the execution probability predictor 93, and also acquires the prediction value of the selection probability $P_{u,c}(x|kx)$ from the selection probability predictor 85. The known probability calculator 94 calculates a quotient obtained by dividing the prediction value of the execution probability $P_{u,c}(x)$ by the prediction value of the selection probability $P_{u,c}(x|kx)$ as the known probability $P_{u,c}(kx)$.

The selection probability predicted in the selection probability predictor 85 and the known probability calculated in the known probability calculator 94 are output to the recommendation information generator 24. The recommendation information generator 24 selects an action to be recommended, using the input known probability and selection probability, and generates recommendation information. The process performed in the recommendation information generator 24 is substantially similar to that in the first embodiment.

In addition, FIG. 18 represents an example of data input/output when the execution probability prediction model and the selection probability prediction model are generated, and an example of data input/output when the predicting process is performed using the obtained execution probability prediction model and selection probability prediction model, using arrows for facilitating the understanding of descriptions. Accordingly, the data input/output may also be performed in directions other than the directions indicated by the arrows in FIG. 18 or between regions which are not connected by the arrows.

Figure 19:
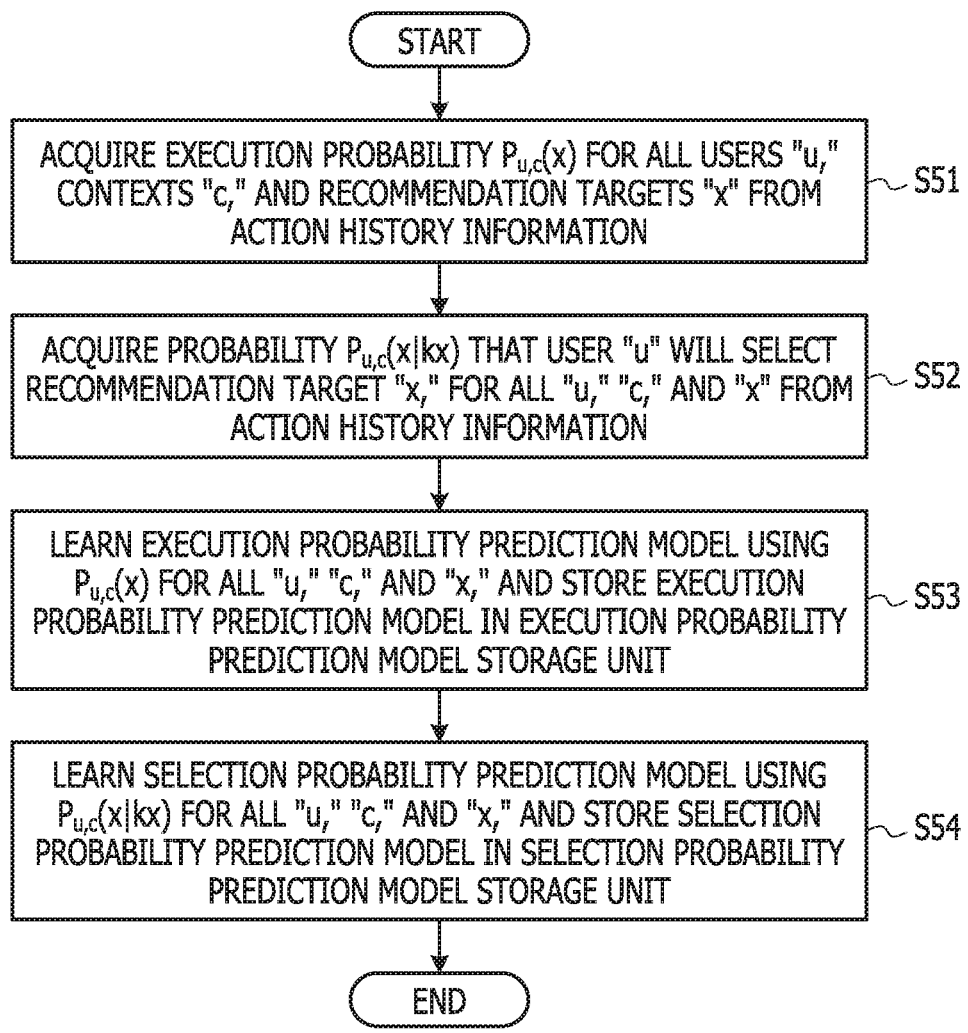
FIG. 19 is a flowchart illustrating an example of a learning process in the fifth embodiment.

FIG. 19 is a flowchart illustrating an example of the learning process according to the fifth embodiment. In addition, the process of FIG. 19 is an example, and the order of the process may be changed according to an implementation. For example, the order of steps S51 and S52 may be arbitrarily changed, or steps S51 and S52 may be performed in parallel. Further, the order of steps S53 and S54 may be changed with each other, or steps S53 and S54 may be performed in parallel. The processes of steps S51 and S52 are substantially similar to those of steps S31 and S32 of FIG. 16.

The execution probability prediction model learning unit 91 learns the execution probability prediction model, using the execution probabilities $P_{u,c}(x)$ for all users "u," contexts "c," and recommendation targets "x," and stores the obtained execution probability prediction model in the execution probability prediction model storage unit 92 (step S53). Meanwhile, the selection probability prediction model learning unit 81 learns the selection probability prediction model, using the selection probabilities $P_{u,c}(x|kx)$ for all users "u," contexts "c," and recommendation targets "x," and stores the obtained selection probability prediction model in the selection probability prediction model storage unit 83 (step S54).

Figure 20:
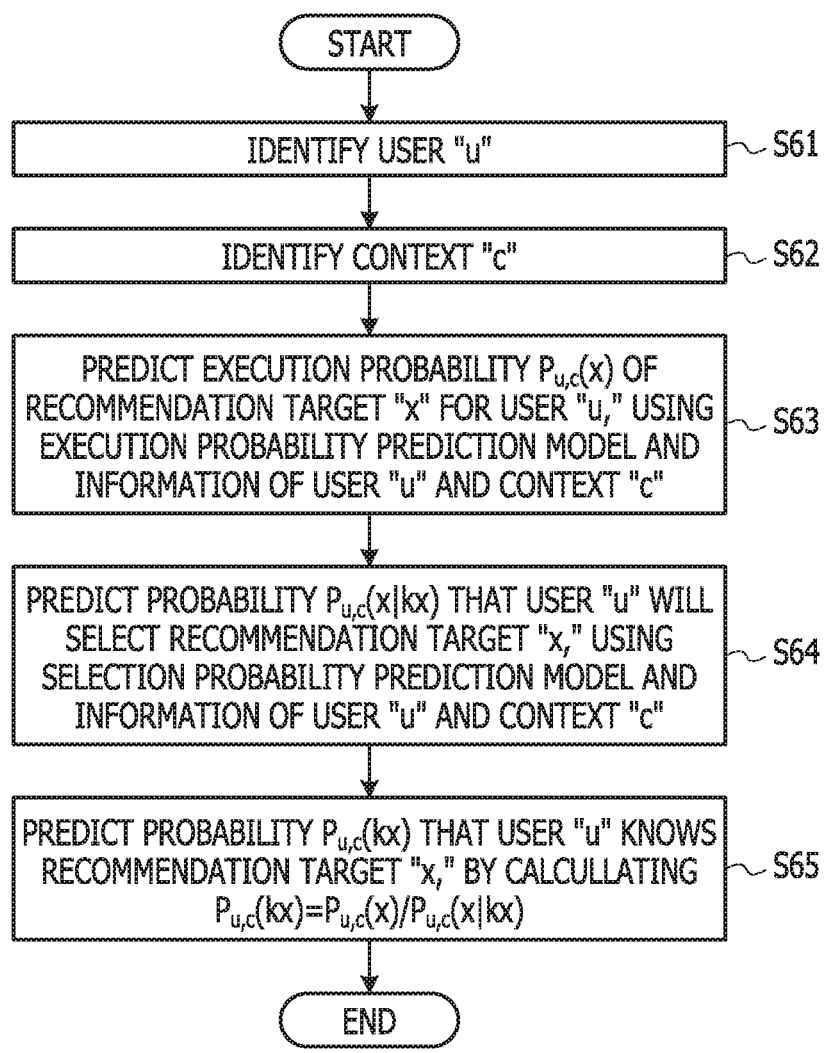
FIG. 20 is a flowchart illustrating an example of a predicting process in the fifth embodiment.

FIG. 20 is a flowchart illustrating an example of the predicting process according to the fifth embodiment. In addition, the process of FIG. 20 is an example, and the order of the process or the like may be changed according to an implementation. For example, the order of steps S61 and S62 may be arbitrarily changed, or steps S61 and S62 may be performed in parallel. Further, the order of steps S63 and S64 may be arbitrarily changed, and steps S63 and S64 may be performed in parallel.

The user identification unit 21 identifies the user "u" (step S61). The context acquisition unit 22 identifies the context "u," using information obtained from the terminal 1 or information on a timing when the information is received from the terminal 1 (step S62). The process of identifying the user "u," the context "c" and others is substantially similar to that in the first embodiment.

The execution probability predictor 93 predicts the execution probability $P_{u,c}(x|kx)$ of the recommendation target "x" of the user "u," using the execution probability prediction model and the information of the user "u" and the context "c" (step S63). The selection probability predictor 85 predicts the probability $P_{u,c}(x|kx)$ that the user "u" will select the recommendation target "x," using the selection probability prediction model and the information of the user "u" and the context "c" (step S64). The known probability calculator 94 calculates $P_{u,c}(kx)=P_{u,c}(x)/P_{u,c}(x|kx)$, using the prediction results in the execution probability predictor 93 and the selection probability predictor 85. As a result of this process, the known probability calculator 94 predicts the probability $P_{u,c}(kx)$ that the user "u" knows the recommendation target "x" (step S65).

Then, the recommendation information generator 24 generates recommendation information, using the selection probability and the known probability obtained in the process represented in the flowchart of FIG. 20. In the fifth embodiment, the probability that the user "u" will execute the action "x" in the context "c" and the probability that the user "u" will select the action "x" in the context "c," with a high accuracy using the execution probability prediction model and the selection probability prediction model generated by the machine learning. By using the execution probability and the selection probability predicted with the high accuracy, it is possible to accurately predict the action that is highly likely to be unknown to the user "u" and is highly likely to be selected by the user "u" when the action is known to the user "u" in the context "c." Thus, according to the fifth embodiment, it is possible to provide information useful for the user "u." Further, in the fifth embodiment, the known probability is calculated only for the user "u," so that the calculation amount is reduced, as compared to the fourth embodiment. Accordingly, the processing load of the information processing apparatus 10 is smaller than that in the fourth embodiment.

<Modifications>

In addition, the embodiments are not limited to those described above, and may be modified in various ways. Examples of the modification will be described.

(1) Modification for Method of Selecting Action to be Recommended

Descriptions have been made on an example where the threshold processing of the known probability and the selection probability is performed, and an action plotted in the region where the known probability for the user is relatively low and the selection probability for the user is relatively high (region "a" in FIG. 8) is determined to be the recommendation target. However, the method of determining the recommendation target may be changed according to an implementation.

For example, an action "x" which has the maximum value of the product of the probability that the user does not currently know the action "x" and the probability that the user will select the action "x" (Equation (13)) may be determined to be the recommendation target.

$$\mathrm{argmax}_x\{(1-P_{u,C}(x|kx)) \times P_{u,C}(x|kx)\} \quad (13)$$

In addition, the information processing apparatus 10 may recommend an action "x" which maximizes an expected value of relative entropy in view of the user. This is because a suggestion that may make the user feel hesitant is valuable for the user even though the suggestion is not selected. In addition, in a situation where the user feels hesitant, the expected value of the relative entropy increases. For example, when the recommended action "x" is known to the user, the increase of the entropy is 0 since the recommendation of the action "x" does not cause the user to feel hesitant in making a choice. Next, a case where the recommended action "x" is unknown to the user will be described. Before the recommendation information is presented, the probability distribution $(P_{u,c}(x), P_{u,c}(\overline{x}))$ of the probability $P_{u,c}(x)$ that the information will be selected and the probability $P_{u,c}(\overline{x})$ that the information will not be selected is (0,1). However, when the action "x" is recommended, the user feels hesitant about selecting the action "x," and thus, the probability distribution $(P_{u,c}(x), P_{u,c}(\overline{x}))$ becomes $(P_{u,c}(x|kx), 1-P_{u,c}(x|kx))$. Here, when the relative entropy is $D(u, c, x)$, $D(u, c, x)$ is expressed by Equation (14).

$$D(u, c, x) = \quad (14)$$
$$P_{u,c}(x|kx)\log\frac{P_{u,c}(x|kx)}{\mathrm{MIN\_PROB}} + (1-P_{u,c}(x|kx))\log\frac{1-P_{u,c}(x|kx)}{1-\mathrm{MIN\_PROB}}$$

In addition, in Equation (14), MIN_PROB is the minimum value of the probabilities which is set for the convenience of calculations. Accordingly, the expected value $Ex(D(u, c, x))$ of the entropy increase as a result of recommending the action "x" to the user "u" in the context "c" is expressed by Equation (15).

$$Ex(D(u,c,x)) = (1-P_{u,C}(kx)) \times D(u,c,x) \quad (15)$$

Figure 21:
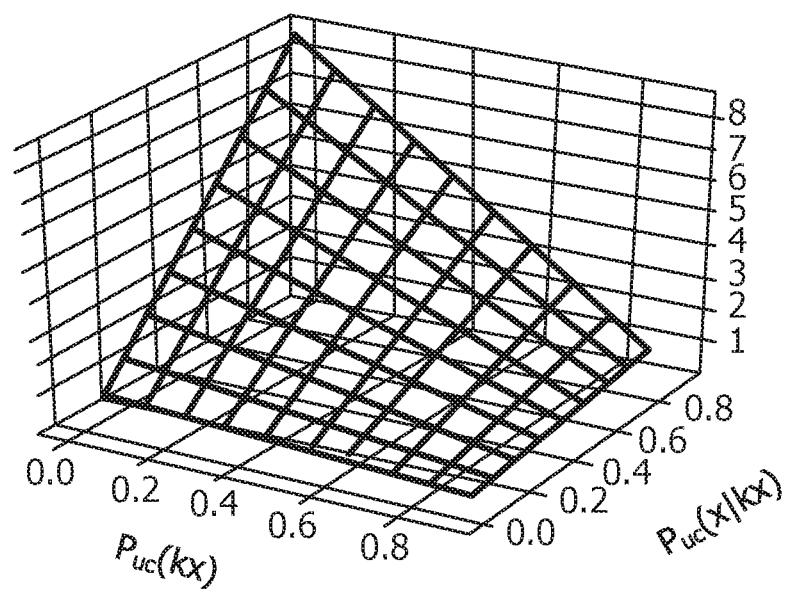
FIG. 21 is a view illustrating an example of a relationship among an expected value of a relative entropy, a known probability, and a selection probability.

FIG. 21 is a view illustrating an example of a relationship among the expected value of the relative entropy, the known probability, and the selection probability. The vertical axis of FIG. 21 is the expected value $Ex(D(u, c, x))$ of the relative entropy. Further, in FIG. 21, $P_{u,c}(kx)$ is the probability that the user "u" knows the action "x" in the context "c," and $P_{u,c}(x|kx)$ is the probability that the user "u" will select the action "x" in the context "c." Accordingly, the recommendation information generator 24 may calculate the variation of the relative entropy illustrated in FIG. 21, so as to select the action "x" which has the maximum value of the expected value of the relative entropy, as the recommendation target.

(2) Modification for Copying with Change in User's Knowledge or Thinking

In any of the first to fifth embodiments, all the information in the action history information 51 may not be treated equally, and calculations may be performed giving an importance on recommendation information included within a predetermined number of times counted back from the timing when recommendation information is currently generated. For example, it is assumed that the selection probability $P_{u,c}(x|kx)$ calculated in the previous recommending process in the context "c" of the user "u" is $P'_{u,c}(x|kx)$, and a predetermined number of times is N. Further, it is assumed that the number of times of the process counted back from the current recommendation in the context "c" of the user "u" is "n."

When the number of times of the process "n" counted back from the current recommendation is equal to or less than N, the current selection probability is calculated by Equation (16).

$$P_{u,c}(x|kx) = \frac{n_{ra}(u, c, x)}{n_r(u, c, x)} \quad (16)$$

Here, $n_{ra}(u, c, x)$ is the number of times the user "u" to whom "x" has been recommended in the context "c" has executed "x." The calculation of Equation (16) is substantially similar to calculation described above with reference to FIG. 7 and others. The value of the denominator in the right side of Equation (16) is the number of times "x" has been recommended in the context "c."

Meanwhile, when the number of times of the process "n" counted back from the current recommendation exceeds the predetermined number of times N, the current selection probability is calculated by Equation (17).

$$P_{u,c}(x|kx) = (1-\gamma)P'_{u,c}(x|kx) + \gamma \times y \quad (17)$$

In Equation (17), γ is a learning rate, and 0<γ<1. Further, y is a value that indicates a selection result of the user "u." When the user "u" selects the recommended "x," y=1, and when the user "u" does not select the recommended "x," y=0.

In this way, by giving an importance on relatively new data among the data included in the action history information 51, the information processing apparatus 10 may flexibly cope with a change in knowledge or preference of the user "u."

(3) Miscellaneous

In the second to fifth embodiments as well, the action history information 51 is updated by the action grasping unit 40 as in the first embodiment, and thus, a subsequent recommending process is performed by the updated action history information 51. Accordingly, in any of the embodiments, the amount of information recorded in the action history information 51 increases along with the increase of the number of times of the recommending process, so that it becomes easy to perform a relatively appropriate recommending process.

A modification may be made to use the user similarity when the learning data for the machine learning is generated in the fourth and fifth embodiments. In this case, the information processing apparatus 10 according to the fourth and fifth embodiments also has the user attribute information 52. In addition, a modification may be made to use the user similarity when the prediction is performed using the known probability prediction model, the selection probability prediction model, the execution probability prediction model, and others which are obtained by the machine learning.

When the number of data included in the action history information 51 is small, the information included in the action history information 51 is small. Thus, the calculation equations may be appropriately modified to prevent biased information from being selected as a recommendation target. For example, when a predetermined amount of data is not included in the action history information 51, the information processing apparatus 10 may use an average value of the selection probabilities or the known probabilities as an estimated value, instead of using the selection probability or the known probability of an individual person. In addition, the information processing apparatus 10 may include a correction term which becomes a large value when the amount of logs in the action history information 51 is small, in the calculation equation for the selection probability or the known probability.

The tables and others that have been described are examples, and may be changed according to an implementation. For example, the information elements included in the action history information 51 and the user attribute information 52 may be changed according to an implementation.

Further, the information processing apparatus 10 may not be an apparatus that communicates with the terminal 1 of the user, but may be an apparatus that is accessed directly by the user. For example, the information processing apparatus 10 may be installed in an information center, and recommended information may be displayed on a display or the like according to an input from a user. In this case, a feedback of an action taken by the user may be implemented by an input from the user. For example, the information processing apparatus 10 may be modified to display a screen of recommendation information and output a questionnaire screen for requesting an input of a selected action in response. In this case, the action grasping unit 40 analyzes the input from the questionnaire screen, and updates the action history information 51.

According to an aspect of the embodiments, it is possible to recommend information highly valuable for a user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a memory; and
a processor coupled to the memory and the processor configured to:
obtain current situation information, based on sensing data measured by a sensor mounted on a terminal for a user and context information corresponding to the sensing data,
identify at least one action associated with a current situation indicated by the current situation information, based on stored action history information in which information of a past action is associated with past situation information that indicates past context information based on past sensing data, corresponding to execution of the past action, and includes information of an executant who executes the past action and recommendation information provided to the executant;
for an action associated with a past situation, from among the at least one identified action, perform probability calculations of a first probability and a second probability,
the first probability being a probability that the action associated with the past situation is included as a choice for the user,
the second probability being a probability that the user selects the action associated with the past situation when the action is included as the choice, based on generation of a selection probability prediction model using machine learning of a selection probability that a past action is selected by an executant when the past action is recommended, for a combination of the executant and a past situation that indicates past context information based on past sensing data, corresponding to execution of the past action; and
the second probability being determined based on a prediction value obtained from the selection probability prediction model for a combination of information of the user and the current situation indicated by the current situation information; and
output, to the terminal, recommendation information in form of a target action, from among the at least one identified action, having a relatively low first probability and a relatively high second probability, based on the probability calculations.

2. The information processing apparatus according to claim 1, wherein the stored action history information includes recommendation information provided to an executant of the past action before the past action is executed, and the processor is further configured to:
calculate the second probability for the target action, as a probability that the target action is selected when the target action is recommended in the current situation indicated by the current situation information based on the action history information; and
calculate the first probability for the target action, as a quotient obtained by dividing a probability that the target action is executed in the situation indicated by the situation information by the second probability for the target action based on the stored action history information.

3. The information processing apparatus according to claim 1, wherein
to perform the calculation of the second probability, the processor is further configured to:
generate the selection probability prediction model using the machine learning of the selection probability.

4. The information processing apparatus according to claim 3, wherein
the processor is further configured to:
generate a known probability prediction model by machine learning of a quotient obtained by dividing a probability that the past action is executed by the selection probability as a probability that the executant knows the past action, for the combination of the executant and the past situation where the past action is executed; and
determine a prediction value obtained from the known probability prediction model for the combination of the information of the user and the current situation indicated by the current situation information to be the first probability.

5. The information processing apparatus according to claim 1, wherein
the processor is further configured to:
analyze, to determine an action executed by the user, further information that is input after the recommendation information is output, the further information being input from an output destination of the recommendation information; and
update the action history information based on a determination result.

6. The information processing apparatus according to claim 1, wherein
the memory stores attribute information that records, for the executant included in the action history information, an index value for a strength of interest in each of one or more categories usable for classifying the recommendation information, and
the processor is further configured to:
calculate a similarity between the user and the executant based on the attribute information; and
calculate the second probability based on the similarity and a value of a probability that the target action is selected by the executant.

7. A non-transitory computer-readable recording medium having stored therein a program that causes a computer to execute a process, the process comprising:
obtaining current situation information, based on sensing data measured by a sensor mounted on a terminal for a user and context information corresponding to the sensing data;
identifying at least one action associated with a current situation indicated by the current situation information, based on stored action history information in which information of a past action is associated with past situation information that indicates past context information based on past sensing data, corresponding to execution of the past action, and includes information of an executant who executes the past action and recommendation information provided to the executant;
for an action associated with a past situation, from among the at least one identified action, performing probability calculations of a first probability and a second probability,
the first probability being a probability that the action associated with the past situation is included as a choice for the user,
the second probability being a probability that the user selects the action associated with the past situation when the action is included as the choice, based on generation of a selection probability prediction model using machine learning of a selection probability that a past action is selected by an executant when the past action is recommended, for a combination of the executant and a past situation that indicates past context information based on past sensing data, corresponding to execution of the past action, resulting in the second probability being determined based on a prediction value obtained from the selection probability prediction model for a combination of information of the user and the current situation indicated by the current situation information; and
outputting, to the terminal, recommendation information in form of a target action, from among the at least one identified action, having a relatively low first probability and a relatively high second probability, based on the probability calculations.

8. A recommendation control method, comprising:
by a computer,
obtain current situation information, based on sensing data measured by a sensor mounted on a terminal for a user and context information corresponding to the sensing data;
identifying at least one action associated with a current situation indicated by the current situation information, based on stored action history information in which information of a past action is associated with past situation information that indicates past context information based on past sensing data, corresponding to execution of the past action, and includes information of an executant who executes the past action and recommendation information provided to the executant;
for an action associated with a past situation, from among the at least one identified action, performing probability calculation of first probability and a second probability,
the first probability being a probability that the action associated with the past situation is included as a choice for the user,
the second probability being a probability that the user selects the action associated with the past situation when the target action is included as the choice, based on generation of a selection probability prediction model using machine learning of a selection probability that a past action is selected by an executant when the past action is recommended, for a combination of the executant and a past situation that indicates past context information based on past sensing data, corresponding to execution of the past action, resulting in the second probability being determined based on a prediction value obtained from the selection probability prediction model for a combination of information of the user and the current situation indicated by the current situation information; and
outputting, to the terminal, recommendation information in form of a target action, from among the at least one identified action, having a relatively low first probability and a relatively high second probability, based on the probability calculations.

* * * * *